US000001508H

United States Statutory Invention Registration [19]

[11] Reg. Number: H1508

Hirano

[45] Published: Dec. 5, 1995

[54] IMAGE-FORMING PROCESS

[75] Inventor: Masato Hirano, Kanagawa, Japan

[73] Assignee: Fuji Photo Film Co., Ltd., Minami-ashigara, Japan

[21] Appl. No.: 262,450

[22] Filed: Jun. 20, 1994

[30] Foreign Application Priority Data

Jun. 18, 1993 [JP] Japan ..... 5-170980

[51] Int. Cl.[6] ..... G03C 1/06

[52] U.S. Cl. ..... 430/265; 430/434; 430/435; 430/439; 430/440; 430/480

[58] Field of Search ..... 430/264, 265, 430/435, 439, 440, 480, 434

[56] References Cited

U.S. PATENT DOCUMENTS

| | | | |
|---|---|---|---|
| 5,196,298 | 3/1993 | Meeus et al. | 430/440 |
| 5,217,842 | 6/1993 | Kojima et al. | 430/264 |
| 5,236,816 | 8/1993 | Purol et al. | 430/492 |
| 5,264,323 | 11/1993 | Purol eet al. | 430/264 |
| 5,284,733 | 2/1994 | Kojima et al. | 430/265 |
| 5,288,590 | 2/1994 | Kuwabara et al. | 430/264 |

FOREIGN PATENT DOCUMENTS

| | | |
|---|---|---|
| WO9311456 | 6/1993 | WIPO . |
| WO9312463 | 6/1993 | WIPO . |

*Primary Examiner*—Donald P. Walsh
*Assistant Examiner*—Chrisman D. Carroll
*Attorney, Agent, or Firm*—Sughrue, Mion, Zinn, Macpeak & Seas

[57] ABSTRACT

An image-forming process for silver halide photographic material is disclosed, in which the photosensitive material have at least one silver halide emulsion layer on a support and contains a hydrzaine compound in the emulsion layer or other constitutional layers. The image-forming process comprises developing the photographic material containing the hydrozine compound of formula (I) with the developing agent of formula (II).

(I)

(II)

10 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

IMAGE-FORMING PROCESS

FIELD OF THE INVENTION

The present invention relates to an image-forming process for providing a ultrahigh contrast with a silver halide photographic material, more particularly, to an image-forming process which is capable of forming ultrahard image with a developing solution containing no dihydroxybenzene series developing agent.

BACKGROUND OF THE INVENTION

In a field of a graphic art, in order to improve a reproduction of an image of a continuous gradation with a halftone dot image or a reproduction of a line image, an image-forming system showing a ultrahard (in particular, gamma (γ) is 10 or more) photographic characteristic is required.

A lithographic developing system utilizing a so-called "infectious development effect" has been used from the past as a method for obtaining a photographic characteristic of a high contrast but it has a defect that a developing solution is instable and difficult to use.

Meanwhile, a method. for obtaining it with a more stable developing solution includes the methods described in U.S. Pat. Nos. 4,224,401, 4,168,977, 4,166,742, 4,311,781, 4,272,606, 4,221,857, 4,332,878, 4,634,661, 4,618,574, 4,269,922, 5,650,746, and 4,681,836.

The image-forming system is a system in which a silver halide photographic material of a surface latent image type containing a hydrazine derivative is processed in a stable MQ developing solution of pH 11 to 12.3 (an MQ developing solution means a developing solution using hydroquinone and p-aminophenol in combination) or a PQ developing solution (which means a developing solution using hydroquinone and 1-phenyl-3-pyrazolidones in combination) to obtain a ultrahard negative image having γ exceeding 10.

According to this process, a photographic characteristic of a ultrahard contrast and a high sensitivity can be obtained and sulfite of a high concentration is allowed to add to a developing solution. Accordingly, a stability of the developing solution against air oxidation is improved with great strides as compared with a conventional lithographic developing solution.

With respect to a light-sensitive material for a daylight which is used for a dot to dot work process, trying to faithfully carry out, for example, a superposed dot to dot work of a halftone dot original and a line image original requires a ultrahard image-forming system. The image-forming system described above using a hydrazine derivative is effective as well for this purpose, and the specific examples for application thereof are disclosed in JP-A-62-640 (the term "JP-A" as used herein means an unexamined published Japanese patent application), JP-A-62-235938, JP-A-62-235939, JP-A-63-104046, JP-A-63-103235, JP-A-63-296031, JP-A-63-314541, and JP-A-64- 13545.

Meanwhile, it is well known in the arts that endiols such as ascorbic acid functions as a developing agent and are paid attention as a developing agent having no ecological and toxicological problems described above. It is indicated in, for example, U.S. Patents 2,688,549 and 3,826,654 that an image formation is possible under a high alkaline condition of at least pH 12 or higher. However, an image of a high contrast can not be obtained with these image-forming processes.

Increasing a contrast with a developing system using ascorbic acid has been tried to some extent. For example, Zwicky indicates that a kind of a lithographic effect is developed when ascorbic acid is used as a sole developing agent (J. Phot. Sc. Volume 27, pp. 185 (1979)) but it was a system having a pretty low contrast as compared with a case of a hydroquinone developing agent system. Further, a system in which a di-quaternary ammonium salt and ascorbic acid are used in combination is disclosed in U.S. Patent T896,022 and JP-B- 46939 (the term "JP-B" as used herein means an examined Japanese patent publication) but an effect for an increased contrast is scarcely found while a development accelerating effect is seen. An effect for a combined use of ascorbic acid and a quaternary salt is described as well in JP-A-3-249756 and 4-32838 but a contrast of an image obtained is not sufficient.

Further, it is indicated in JP-A-5-88306 that a high contrast can be obtained by using ascorbic acid as a sole developing agent and maintaining pH to 12.0 or higher but a problem is involved in a stability of the developing solution.

There also is a case (U.S. Pat. No. 3,730,727) that use of a specific developing solution using ascorbic acid and a hydrazine derivative as the main components can provide a developing system giving a high sensitivity and low stain and fog but nothing is described on an improvement in a contrast.

A ultrahard image-forming system using a hydrazine derivative is a system using a dihydroxybenzene compound such as hydroquinone as a developing agent as described above and has several disadvantages from ecological and toxicological points of view. For example, hydroquinone is an undesirable component because of an allergic disadvantages, and 1-phenyl-3-pyrazolidones are a component having an inferior biodegradation. Further, sulfite of a high concentration shows a high COD (chemical oxygen demand). In this image-forming system, amines described in U.S. Pat. No. 4,975,354 are usually used in combination but not preferred in terms of a toxicity and a volatility.

Accordingly, the object of the present invention is to provide a novel image-forming process which makes it possible to obtain a high contrast image required in a graphic art field by using a developing solution having no problem against an ecological system and a working environment.

SUMMARY OF THE INVENTION

The objects of the present invention have been achieved by an image-forming process in which a photographic material having at least one silver halide emulsion layer on a support and containing a hydrazine compound in the above emulsion layer or the other constitutional layers, is subjected to a development processing in a developing solution after exposing, wherein the above hydrazine compound is represented by the following formula (I); the above developing solution contains a developing agent represented by the following formula (II) and does not substantially contain a dihydroxybenzene developing agent:

$$R_1-\underset{\underset{A_1}{|}}{N}-\underset{\underset{A_2}{|}}{N}-G_1-R_2 \qquad (I)$$

wherein $R_1$ represents an aliphatic group or an aromatic group; $R_2$ represents a hydrogen atom, an alkyl group, an aryl group, an unsaturated heterocyclic group, an alkoxy group, an aryloxy group, an amino group, a hydrazinc group, a carbamoyl group, or an oxycarbonyl group; $G_1$ represents —CO—, —$SO_2$—, —SO—,

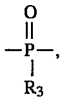

—CO—CO—, a thiocarbonyl group, or an iminomethylene group; both of $A_1$ and $A_2$ represent a hydrogen atom, or either of them represents a hydrogen atom and another represents a substituted or non-substituted alkylsulfonyl group, a substituted or non-substituted arylsulfonyl group, or a substituted or non-substituted acyl group; $R_3$ is the same groups as those defined for $R_2$ or may be different from $R_2$; provided that at least one of $R_1$ and $R_2$ has a ballast group, at least one of $R_1$ and $R_2$ has a group enhancing an adsorption to a silver halide grain surface, $R_1$ has a trialkylammonium group, or $R_1$ has an alkylthio group (including a cycloalkylthio group) or an arylthio group, except that $R_1$ has the following structure;

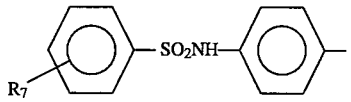

wherein $R_7$ represents a group containing three or more units of —$CH_2CH_2O$— in sequence or a group containing pyridinum group; and n is 1 or 2;

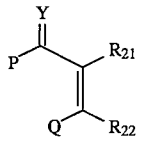

(II)

wherein $R_{21}$ and $R_{22}$ each represent a hydroxy group, an amino group, an acylamino group, an alkylsulfonylamino group, an arylsulfonylamino group, an alkoxycarbonylamino group, a mercapto group, or an alkylthio group; P and Q each represent a hydroxy group, a carboxyl group, an alkoxy group, a hydroxyalkyl group, a carboxyalkyl group, a sulfo group, a sulfoalkyl group, an amino group, an aminoalkyl group, an alkyl group, or an aryl group, or P and Q represent an atomic group forming a 5- to 7-membered ring together with two vinyl carbon atoms on which $R_1$ and $R_2$ are substituted and a carbon atom on which Y is substituted; Y represents =0 or =N-$R_3$; and $R_3$ represents a hydrogen atom, a hydroxyl group, an alkyl group, an acyl group, a hydroxyalkyl group, a sulfoalkyl group, or a carboxyalkyl group.

DETAILED DESCRIPTION OF THE INVENTION

The hydrazine compound represented by formula (I) will be explained in detail.

In formula (I), the aliphatic group represented by $R_1$ has preferably 1 to 30 carbon atoms and particularly is a linear, branched or cyclic alkyl group having 1 to 20 carbon atoms, wherein the branched alkyl group may be cyclized so that a saturated heterocyclic group containing therein one or more hetero atoms is formed; and this alkyl group may have a substituent such as an alkyl group, an aryl group, an alkoxy group, a sulfoxy group, a sulfonamide group, and a carbonamide group.

In formula (I), the aromatic group represented by $R_1$ is a monocyclic or dicyclic aryl group or an unsaturated heterocyclic group, wherein the unsaturated heterocyclic group may be condensed with a monocyclic or dicyclic aryl group to form a heteroaryl group. It includes, for example, a benzene ring, a naphthalene ring, a pyridine ring, a pyrimidine ring, an imidazole ring, a pyrazole ring, a quinoline ring, an isoquinoline ring, a benzimidazole ring, a thiazole ring, and a benzothiazole ring. Of them, that containing a benzene ring is preferred.

Particularly preferred as $R_1$ is an aryl group.

The aryl group or the unsaturated heterocyclic group of $R_1$ may be substituted. Example of the representative substituent includes, for example, an alkyl group, an aralkyl group, an alkenyl group, an alkynyl group, an alkoxy group, an aryl group, a substituted amino group, a ureido group, a urethane group, an aryloxy group, a sulfamoyl group, a carbamoyl group, an alkyl- or arylthio group, an alkyl- or arylsulfonyl group, an alkyl- or arylsulfinyl group, a hydroxy group, a halogen atom, a cyano group, a sulfo group, an aryloxycarbonyl group, an acyl group, an alkoxycarbonyl group, an acyloxy group, a carbonamide group, a sulfonamide group, a carboxyl group, a phosphoric amide group, a diacylamino group, an imide group, and a $R_2$—NH—CO—$NR_2$—CO— group. The preferred substituents include a linear, branched or cyclic alkyl group (preferably that having 1 to 20 carbon atoms), an aralkyl group (preferably a monocyclic or dicyclic one having 1 to 3 carbon atoms in an alkyl portion), an alkoxy group (preferably that having 1 to 20 carbon atoms), a substituted amino group (preferably an amino group substituted with an alkyl group having 1 to 20 carbon atoms), an acylamino group (preferably that having 2 to 30 carbon atoms), a sulfonamide group (preferably that having 1 to 30 carbon atoms), a ureido group (preferably that having 1 to 30 carbon atoms), and a phosphoric amide group (preferably that having 1 to 30 carbon atoms).

In the case where $R_1$ is an aryl group and the substituent therefor is an arylsulfonamide group, there is excluded from the present invention, a group in which a group substituted to an aryl group of the arylsulfonamide group contains three or more —$CH_2$—$CH_2O$— units in the structure thereof, or a group containing a pyridinium group.

In formula (I), the alkyl group represented by $R_2$ is preferably an alkyl group having 1 to 4 carbon atoms and may have a substituent such as a halogen atom, a hydroxyl group, a cyano group, a carboxy group, a sulfo group, an alkoxy group, a phenyl group, an acyl group, an alkoxycarbonyl group, an aryloxycarbonyl group, a carbamoyl group, an alkyl- or arylsulfonyl group, a sulfamoyl group, a nitro group, a heteroaromacyclic group, and a $R_1$—$NA_1$—$NA_2$—$G_1$— group. These substituent groups may further be substituted.

A monocyclic or dicyclic aryl group is preferred as the aryl group, and it is, for example, that containing a benzene ring. This aryl group may be substituted and the examples of the substituent are the same ones as the case of the alkyl group.

Preferred as the unsaturated heterocyclic group is a 5- to 6-membered unsaturated heterocyclic group containing at least one of a nitrogen atom, an oxygen atom and a sulfur atom in the ring, which includes, for example, an imidazolyl group, a pyrazolyl group, a triazolyl group, a tetrazolyl group, a pyridyl group, a pyridinium group, a quinolium group, and a quinolinyl group. The pyridyl group or the pyridinium group is particularly preferred.

An alkoxy group having 1 to 8 carbon atoms is preferred as the alkoxy group and may be substituted with a halogen atom and an aryl group.

A monocyclic group is preferred as the aryloxy group and a substituent includes a halogen atom.

Preferred as the amino group are a non-substituted amino group, an alkylamino group having 1 to 10 carbon atoms, and an arylamino group and may be substituted with an alkyl group, a halogen atom, a cyano group, a nitro group, and a carboxy group.

Preferred as the carbamoyl group are a non-substituted carbamoyl group, an alkylcarbamoyl group having 1 to 10 carbon atoms, and an arylcarbamoyl group and may be substituted with an alkyl group, a halogen atom, a cyano group, and a carboxy group.

Preferred as the oxycarbonyl group are an alkoxycarbonyl group having 1 to 10 carbon atoms, and an aryloxycarbonyl group and may be substituted with an alkyl group, a halogen atom, a cyano group, and a nitro group.

In the case where $G_1$ is —CO—, of the groups represented by $R_2$, preferred is a hydrogen atom, an alkyl group (for example, methyl, trifluoromethyl, 3-hydroxypropyl, 3-methanesulfonamidepropyl, and phenylsulfonylmethyl), an aralkyl group (for example, o-hydroxybenzyl), or an aryl group (for example, phenyl, 3,5-dichlorophenyl, o-methanesulfonamidephenyl, 4-methanesulfonylphenyl, and 2-hydroxymethylphenyl). A hydrogen atom is particularly preferred.

In the case where $G_1$ is —$SO_2$—, $R_2$ is preferably an alkyl group (for example, methyl), an aralkyl group (for example, o-hydroxybenzyl), an aryl group (for example, phenyl), or a substituted amino group (for example, dimethylamino). In the case where $G_1$ is a —SO— group, preferred $R_2$ includes a cyanobenzyl group and a methylthiobenzyl group, and in the case where $G_1$ is —$PO(R_2)$—, $R_2$ is preferably methoxy, ethoxy, butoxy, phenoxy, or phenyl. In particular, phenoxy is suitable. In the case where $G_1$ is an N-substituted or non-substituted iminomethylene group, preferred $R_2$ is methyl, ethyl, or substituted or non-substituted phenyl.

The substituents for $R_1$ can be applied as well to the substituents for $R_2$.

A —CO— group is most preferred as G in formula (I).

Also, $R_2$ may be a portion of $G_1$-$R_2$ to split off from a residual part and may cause a cyclization reaction by which a cyclic structure containing the atoms in the portion of —$G_1$—$R_2$ is formed. To be concrete, example of $R_2$ may be represented by formula (a):

$$—R_3—Z_1 \quad (a)$$

wherein $Z_1$ is a group which can nucleophilically attack $G_1$ to split a $G_1$-$R_3$ -$Z_1$ portion off from a residue of the molecule; and $R_3$ is obtained by removing one hydrogen atom from $R_2$ and nucleophilically attacks $G_1$ to make $G_1$, $R_3$ and $Z_1$ possible to form a cyclic structure.

To be further detailed, $Z_1$ is a group which can readily react nucleophilically with $G_1$ to split a $R_1$-N=N group from $G_1$ when the hydrazine compound of formula (I) forms the following reaction intermediate by oxidation:

$$R_1\text{-}N{=}N\text{-}G_1\text{-}R_3\text{-}Z_1$$

To be concrete, $Z_1$ may be a functional group which reacts directly with $G_1$, such as OH, SH, $NHR_4$ (wherein $R_4$ is a hydrogen atom, an alkyl group, an aryl group, —$COR_5$, or —$SO_2R_5$, in which $R_5$ represents a hydrogen atom, an alkyl group, an aryl group, or a heterocyclic group), and COOH (in which OH, SH, $NHR_4$ and —COOH may temporarily be so protected that these groups are formed by a hydrolysis with alkali), or may be a functional group which reacts with a nucleophilic agent such as a hydroxyl ion and a sulfurous acid ion to become possible to react with $G_1$, such as —$COR_6$ and —C(=N-$R_7$)-$R_6$ ($R_6$ and $R_7$ each represent a hydrogen atom, an alkyl group, an alkenyl group, an aryl group, or a heterocyclic group). -5- or 6-membered one is preferred as a ring formed by $G_1$, $R_3$ and $Z_1$.

Of those represented by formula (a), those represented by formulas (b) and (c) can be used as a preferred one:

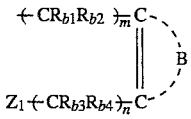

(b)

wherein $R_{b1}$ to $R_{b4}$ each represents a hydrogen atom, an alkyl group (preferably that having 1 to 12 carbon atoms), an alkenyl group (preferably that having 2 to 12 carbon atoms), or an aryl group (preferably that having 6 to 12 carbon atoms), and it may be the same or different; B is the atoms necessary to complete a 5- or 6-membered ring which may have a substituent; and m and n each are 0 or 1 and (n+m) is 1 or 2.

The 5- or 6-membered ring formed by B in formula (b) includes, for example, a cyclohexene ring, a cyclopentene ring, a benzene ring, a naphthalene ring, a pyridine ring, and a quinoline ring. $Z_1$ is the same as that in formula (a).

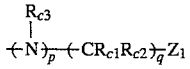

(c)

wherein $R_{c1}$ and $R_{c2}$ each represents a hydrogen atom, an alkyl group, an alkenyl group, an aryl group, or a halogen atom and may be the same or different; $R_{c3}$ represents a hydrogen atom, an alkyl group, an alkenyl group, or an aryl group; and p represents an integer of 0 to 2 and q represents 1 to 4.

$R_{c1}$, $R_{c2}$ and $R_{c3}$ may be combined with each other to form a ring as long as $Z_1$ is of a structure in which $Z_1$ may be an intermolecular nucleophilic attack to $C_1$.

$R_{c1}$ and $R_{c2}$ each are preferably a hydrogen atom, a halogen atom, or an alkyl group, and $R_{c3}$ is preferably an alkyl group or an aryl group.

q represents preferably 1 to 3. p represents 1 or 2 when q is 1, 0 or 1 when q is 2, and 0 or 1 when q is 3. When q is 2 or 3, $(CR_{c1}R_{c2})_A$ may be the same or different. $Z_1$ represents the same as that in formula (a).

$A_1$ and $A_2$ each is a hydrogen atom, an alkylsulfonyl or arylsulfonyl group having 20 or less carbon atoms (preferably phenylsulfonyl or phenylsulfonyl which is substituted so that a sum of a Hammett's substituent constant becomes −0.5 or more), an acyl group having 20 or less carbon atoms (preferably benzoyl or benzoyl which is substituted so that a sum of a Hammett's Substitution Constant may be −0.5 or more), or a linear, branched or cyclic, non-substituted and substituted aliphatic acyl group (a substituent includes a halogen atom, an ether group, a sulfonamide group, a carbonamide group, a hydroxyl group, a carboxy group, and a sulfonic acid group).

A hydrogen atom is the most preferred as $A_1$ and $A_2$. $R_1$ or $R_2$ in formula (I) may have a ballast group or polymer incorporated thereinto, which is conventionally used for an immobile photographic additive such as a coupler. The ballast group having 8 or more carbon atoms, is comparatively inactive to the photographic characteristics, and is selected from, for example, an alkyl group, an alkoxy group, a phenyl group, an alkylphenyl group, a phenoxy group, and an alkylphenoxy group. Also, the polymer described in JP-A-l-100530 may also be used.

$R_1$ or $R_2$ in formula (I) may incorporates a group for strengthening an adsorption to a surface of a silver halide grain. Examples of the adsorbing group include a thiourea group, a heterocyclic thioamide group, a mercapto heterocyclic group, and a triazole group, which are described in U.S. Pat. Nos. 4,385,108 and 4,459,347,JP-A-59-195,233, JP-A-59- 200,231, JP-A-59-201,045, JP-A-59-201,046, JP-A-59-201,047, JP-A- 59-201,048, JP-A-59-201,049, JP-A-61-170,733, JP-A-61-270,744, JP-A-62-948, JP-A-63-234,244, JP-A-63-234,245, and JP-A-63-234,246.

In the present invention, preferably used is the hydrazine compound represented by formula (I) having a ballast group, an immobile group such as a polymer group, or a group enhancing adsorption property to a surface of a silver halide grain into $R_1$ or $R_2$ described above, or the hydrazine compound represented by the following formula (X):

$$(R_{11})_3N^+\text{-}R_{12}\text{-}L_{11}\text{-}(R_{13}\text{-}L_{11})_m\text{-}R_{14}\text{-}NHNH\text{-}G_{11}\text{-}R_{15}\ X^- \qquad (X)$$

wherein $L_{11}$ represents a single bond, —O—, —S—, —$NR_{16}$—, —CO, —$SO_{12}$—, —P(O)($G_{12}R_{16}$)-, or the combination thereof; $L_{12}$ represents —$SO_2NR_{16}$—, —$NR_{16}SO_2NR_{16}$—, —$CONR_{16}$—, —$NR_{16}CONR_{16}$—, or —$G_{12}$P(O)($G_{12}R_{16}$)$NR_{16}$-, in which $G_{12}$ represents a single bond, —O—, or —$NR_{16}$—, wherein $R_{16}$ represents a hydrogen atom, an aliphatic group, or an aromatic group; $G_{11}$ is the same as G in formula (I), and $R_{15}$ is the same as $R_2$ in formula (I); $R_{11}$ represents an aliphatic group or an aromatic group (three $R_{11}$'s may be the same or different), and $R_{12}$, $R_{13}$ and $R_{14}$ each represents a divalent aliphatic group or aromatic group; m is 0 or 1, and $X^-$ represents a paired anion portion in the case where $X^-$ forms a paired anion or an intermolecular salt.

In formula (X), the aliphatic group represented by $R_{11}$ has preferably 1 to 30 carbon-atoms and is particularly a linear, branched or cyclic alkyl group having 1 to 20 carbon atoms.

In formula (X), the aromatic group represented by $R_{11}$ is a monocyclic or dicyclic aryl group or and an unsaturated heterocyclic group, wherein the unsaturated heterocyclic group may be condensed with an aryl group.

The aliphatic group or the aromatic group of $R_1$ may be substituted and examples of the substituents include, for example, an alkyl group, an aralkyl group, an alkenyl group, an alkynyl group, an alkoxy group, an aryl group, a substituted amino group, a ureido group, a urethane group, an aryloxy group, a sulfamoyl group, a carbamoyl group, an alkyl- or arylthio group, an alkyl- or arylsulfonyl group, an alkyl- or arylsulfinyl group, a hydroxy group, a halogen atom, a cyano group, a sulfo group, an aryloxycarbonyl group, an acyl group, an alkoxycarbonyl group, an acyloxy group, a carbonamide group, a sulfonamide group, a carboxyl group, a phosphoric amide group, a diacylamino group, and an imide group. The preferred substituents include an alkyl group (preferably having 1 to 20 carbon atoms), an aralkyl group (preferably having 7 to 30 carbon atoms), an alkoxy group (preferably having 1 to 20 carbon atoms), a substituted amino group (preferably an amino group substituted with an alkyl group having 1 to 20 carbon atoms), an acylamino group (preferably having 2 to 30 carbon atoms), a sulfonamide group (preferably having 1 to 30 carbon atoms), a ureido group (preferably having 1 to 30 carbon atoms), and a phosphoric amide group (preferably having 1 to 30 carbon atoms). These groups may further be substituted.

Three $R_{11}$'s in formula (X) may be the same or different and may be combined with each other to form a ring.

In formula (X), the aliphatic group represented by $R_{12}$, $R_{13}$ and $R_{14}$ preferably has 1 to 30 carbon atoms, particularly a linear, branched or cyclic alkyl group having 1 to 20 carbon atoms.

In formula (X), the aromatic group represented by $R_{12}$, $R_{13}$ and $R_{14}$ is a monocyclic or dicyclic aryl group or an unsaturated heterocyclic group, wherein the unsaturated heterocyclic group may be condensed with an aryl group.

Preferred as $R_{12}$ is an alkyl group having 1 to 10 carbon atoms, and preferred as $R_{13}$ and $R_{14}$ is an aryl group, particularly preferably contains a benzene ring.

The aliphatic group or the aromatic group of $R_{12}$, $R_{13}$ and $R_{14}$ may be substituted, and those enumerated as the substituent for $R_{11}$ can be applied as the representative substituent therefor.

In formula (X), $L_{11}$ represents a single bond, a —O—group, a —S- group, a —$NR_{16}$— group, a —CO-group, a —$SO_{12}$— group, a -P(O)($G_{12}R_{16}$)—group, or the combination thereof and represents preferably a —$SO_2NR_{16}$— group, a —$NR_{16}SO_{12}NR_{16}$—group, a —$CONR_{16}$-group, a —$NR_{16}CONR_{16}$— group, or a —$G_{12}$P(O)($G_{12}R_{16}$)$NR_{16}$—group, particularly preferably represents —$CONR_{16}$—.

In formula (X), of the groups represented by $L_{12}$, particularly preferred is —$SO_2NR_{16}$—.

In formula (X), m is 0 or 1, preferably 1. $R_6$ is preferably a hydrogen atom or an alkyl group having 1 to 6 carbon atoms, particularly preferably a hydrogen atom. In the case where the compound represented by formula (X) contains two or more $R_{16}$ and $G_{12}$, which may be the same or different. $R_{11}$, $R_{12}$, $R_{13}$, $R_{14}$ or $R_{15}$ in formula (X) may have a ballast group or polymer incorporated therein, which is conventionally used for an immobile photographic additive such as a coupler. The ballast group having 8 or more carbon atoms, is relatively inactive to the photographic characteristics, and can be selected from, for example, an alkyl group, an alkoxy group, a phenyl group, an alkylphenyl group, a phenoxy group, and an alkylphenoxy group. Also, the compounds described in JP-A-1- 100530 can be used as the polymer. $R_{11}$, $R_{12}$, $R_{13}$, $R_{14}$ or $R_{15}$ in formula (X) may be incorporated into a group enhancing adsorption property to a surface of a silver halide grain. Examples of the adsorbing group include a thiourea group, a heterocyclic thioamide group, a mercapto heterocyclic group, and a triazole group which are described in U.S. Pat. Nos. 4,385,108 and 4,459,347, JP-A-59-195,233, JP-A-59- 200,231, JP-A-59-201,045, JP-A-59-201,046, JP-A-59-201,047, JP-A- 59-201,048, JP-A-59-201,049, JP-A-61-170,733, JP-A-61-270,744, JP-A-62-948, JP-A-63-234,244, JP-A-63-234,245, and JP-A- 63-234,246.

The examples of the compounds represented by formula (I) will be shown below but the present invention will not be limited thereto.

I-1
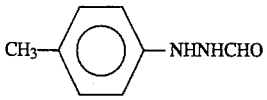
I-2
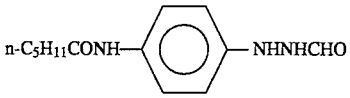
I-3
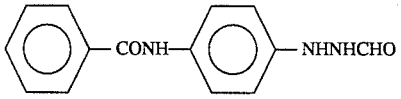
I-4
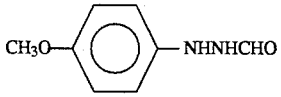
I-5
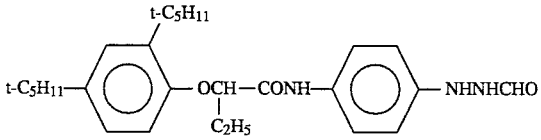
I-6
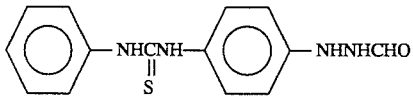
I-7
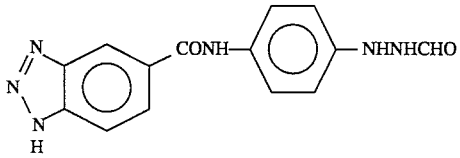
I-8
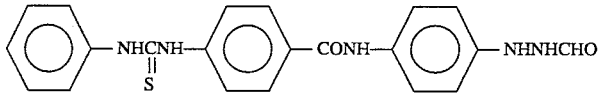
I-9
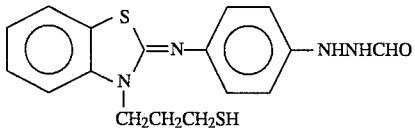
I-10
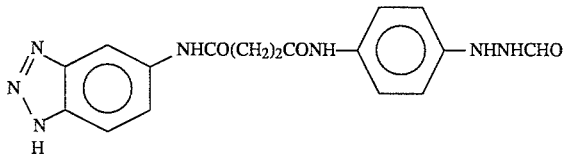
I-11
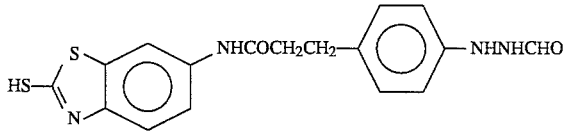
I-12
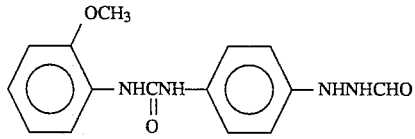

-continued
I-13
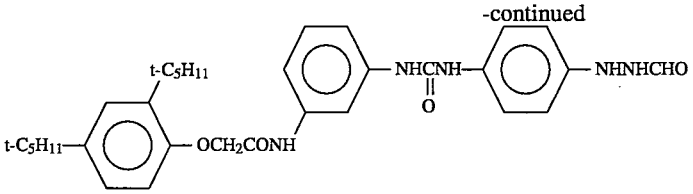
I-14
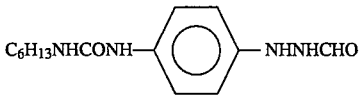
I-15
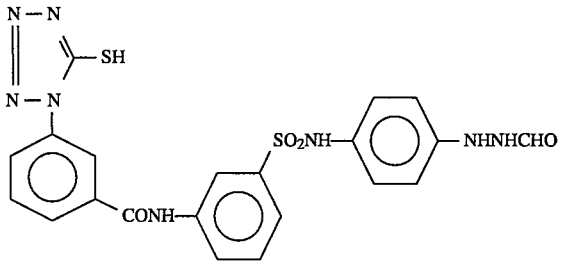
I-16
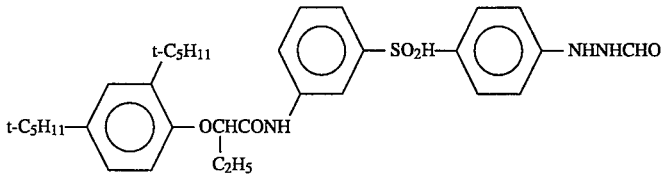
I-17
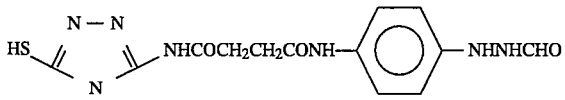
I-18
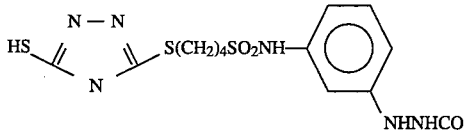
I-19
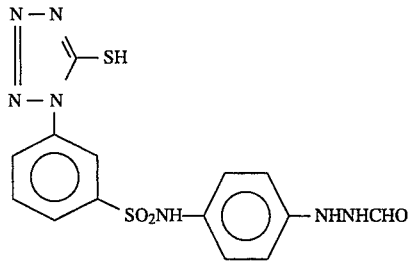
I-20
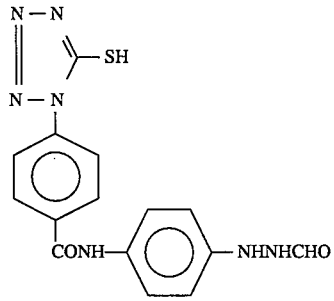

-continued
I-21
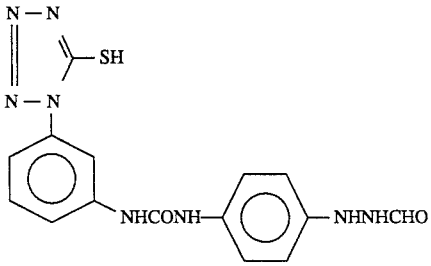
I-22
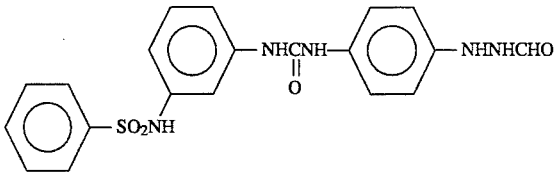
I-23
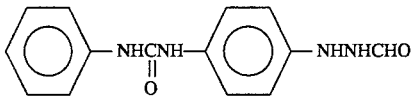
I-24
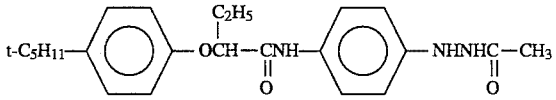
I-25
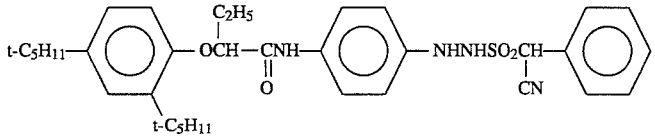
I-26
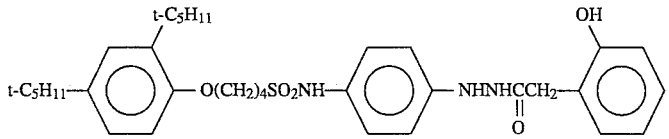
I-27
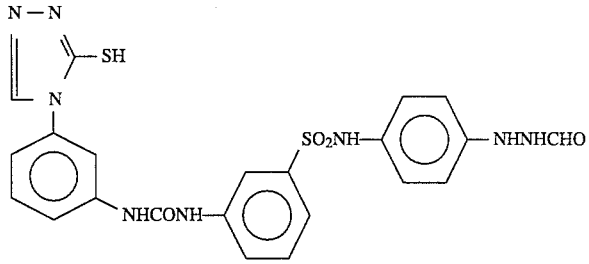
I-28
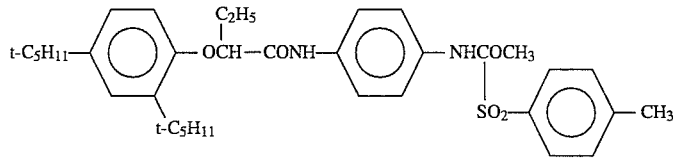
I-29
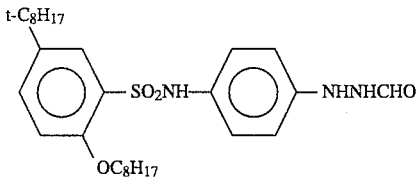

-continued
I-30
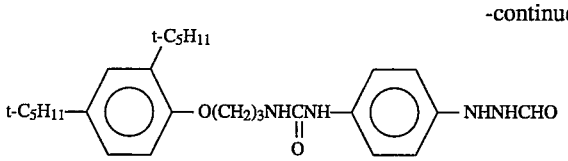
I-31
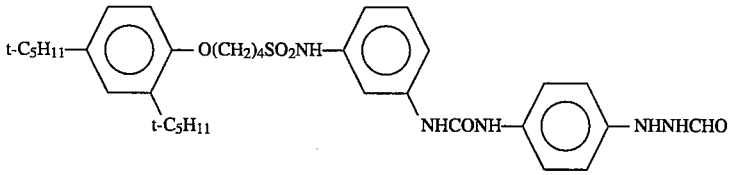
I-32
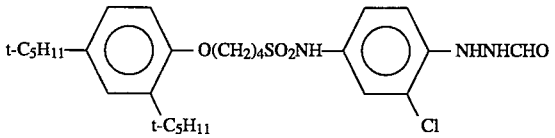
I-33
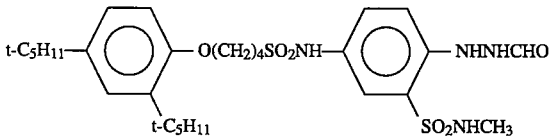
I-34
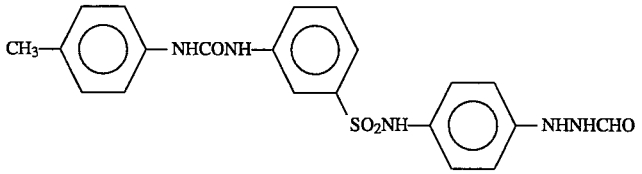
I-35
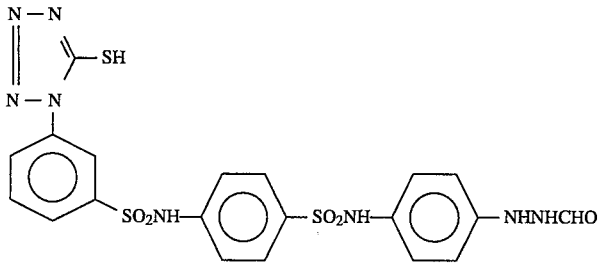
I-36
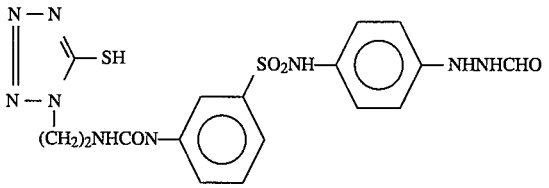
I-37
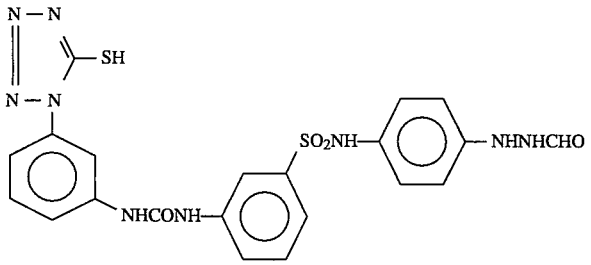

-continued
I-38
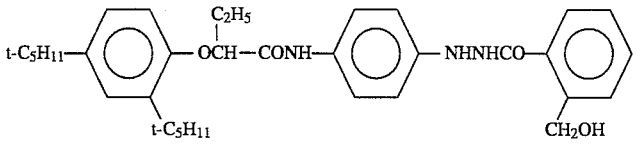
I-39
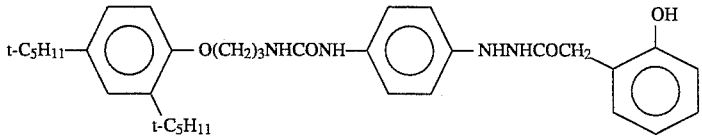
I-40
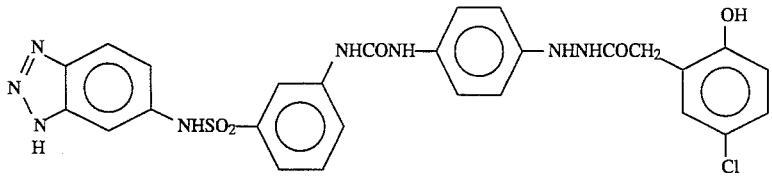
I-41
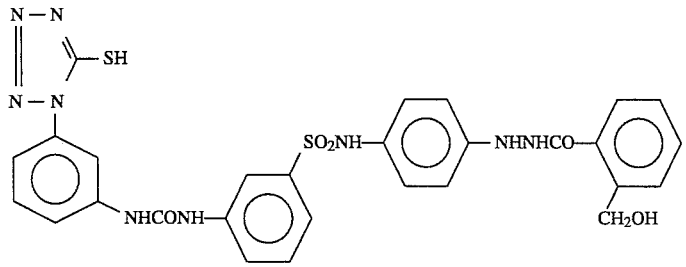
I-42
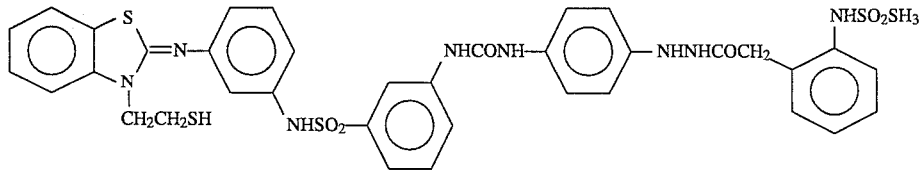
I-43
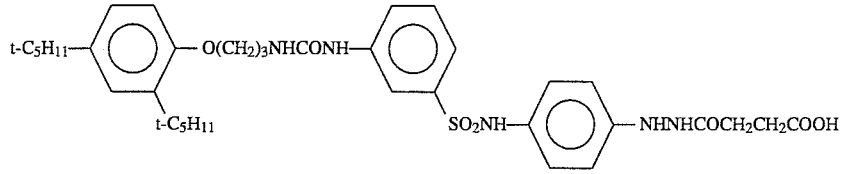
I-44
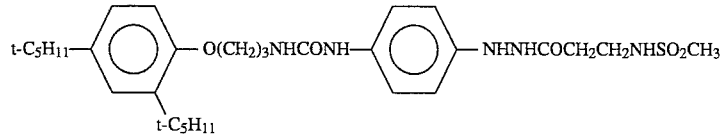
I-45
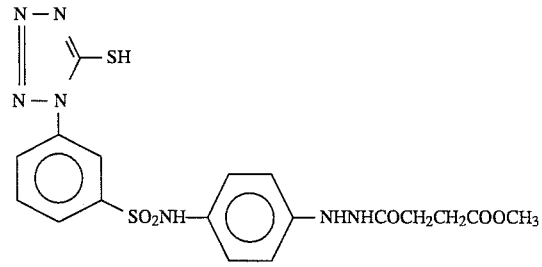
I-46
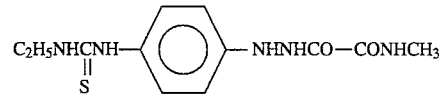

-continued
I-47
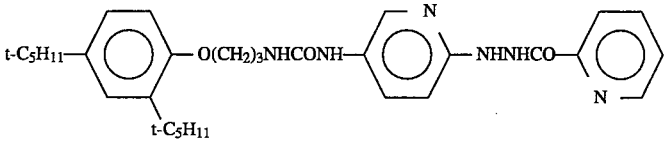
I-48
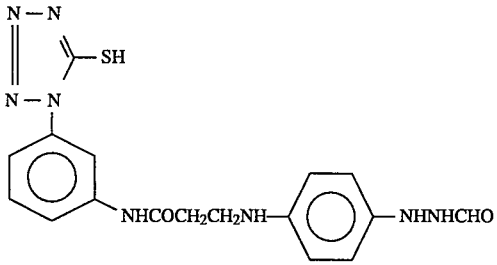
I-49
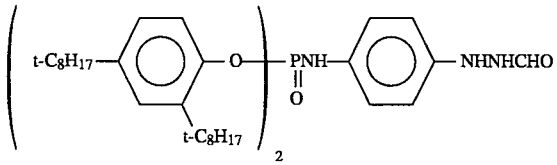
I-50
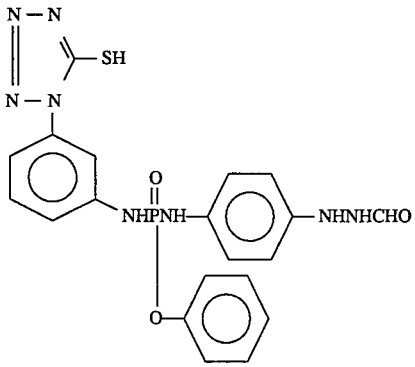
I-51
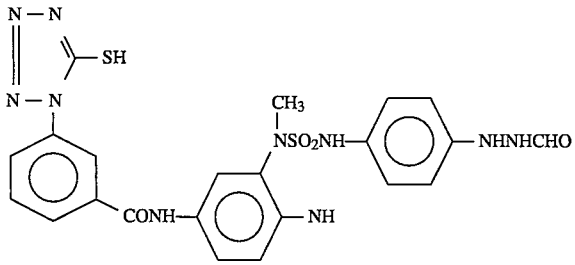
I-52
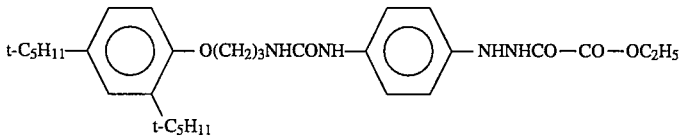
I-53
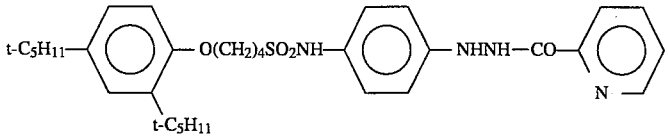

-continued
I-54
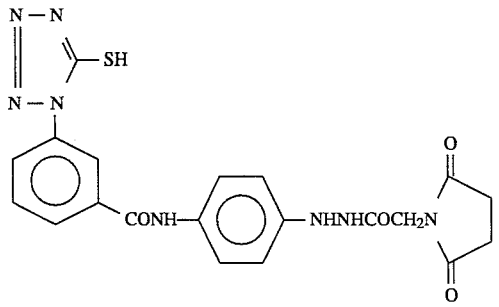
I-55
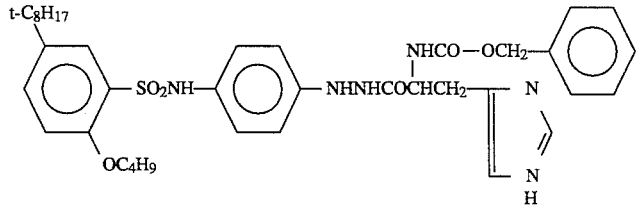
I-56
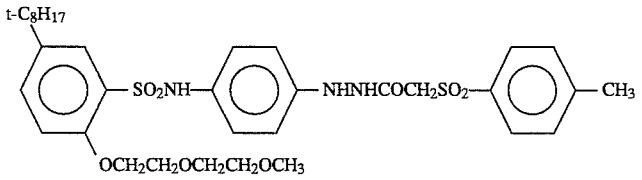
I-57
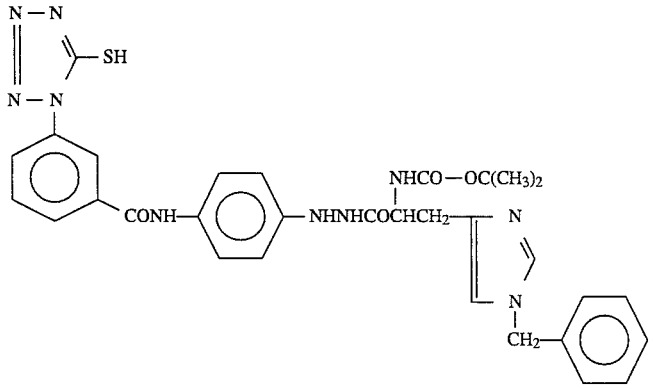
I-58
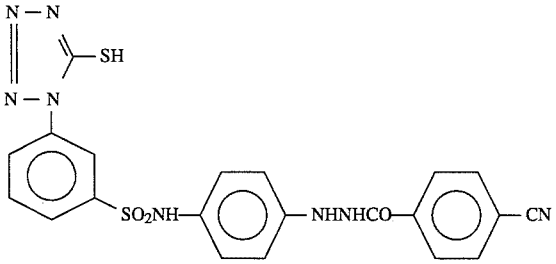
I-59
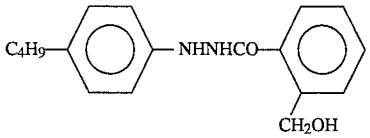

-continued
I-60
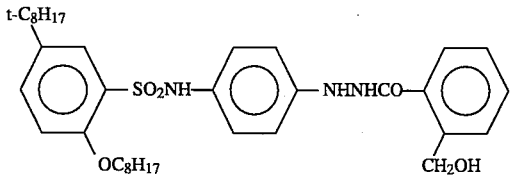
I-61
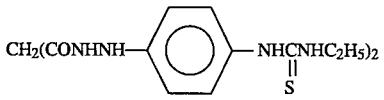
I-62
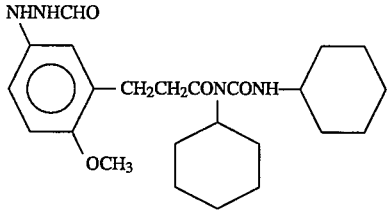
I-63
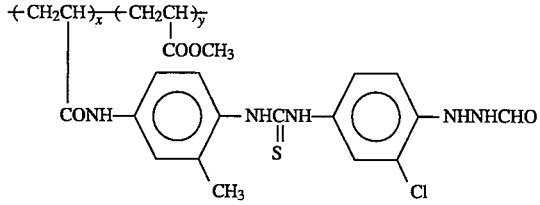
x:y = 3:97
Average Molecular Weight ≈ 100,000
I-64
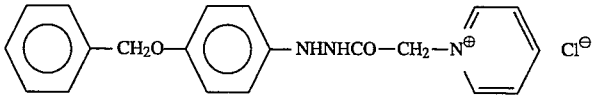
I-65
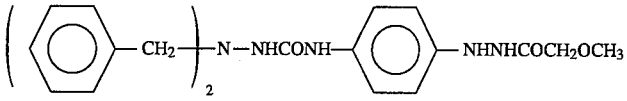
I-66
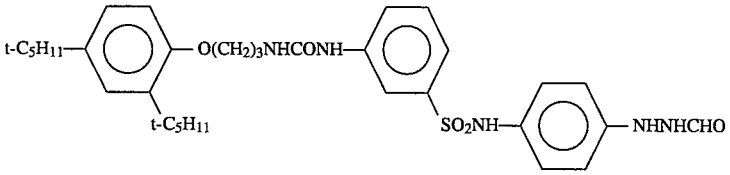
I-67
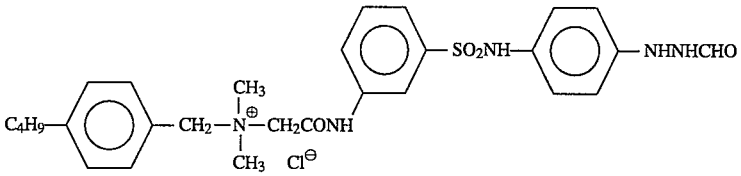
I-68
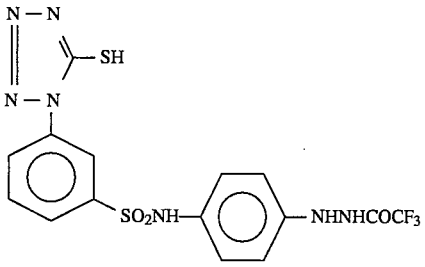

-continued
I-69
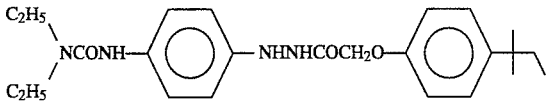
I-70
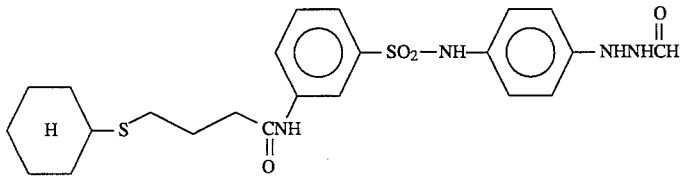
I-71
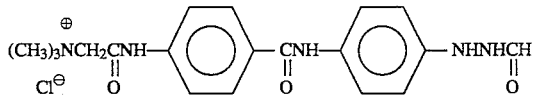
I-72
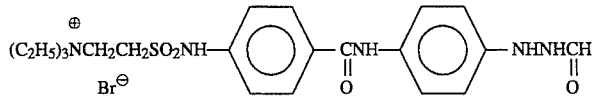
I-73
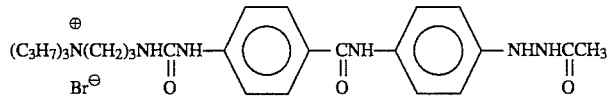
I-74
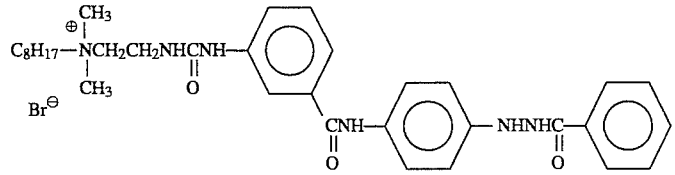
I-75
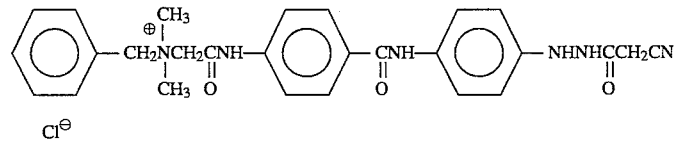
I-76
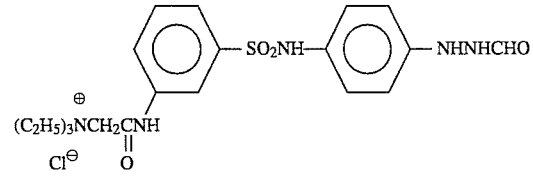
I-77
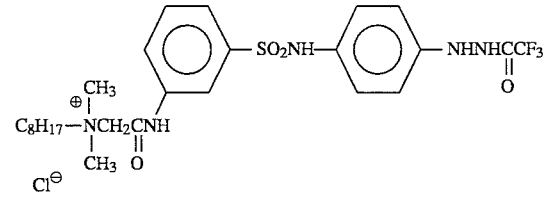
I-78
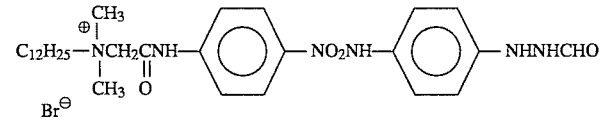

-continued
I-79
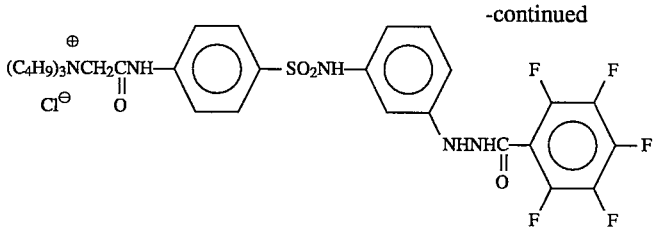
I-80
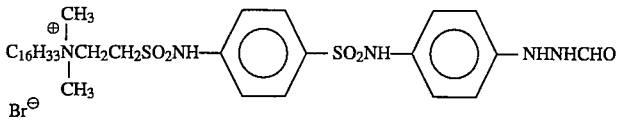
I-81
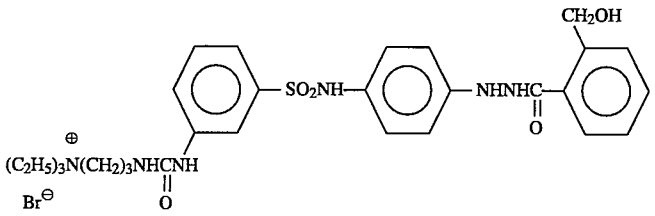
I-82
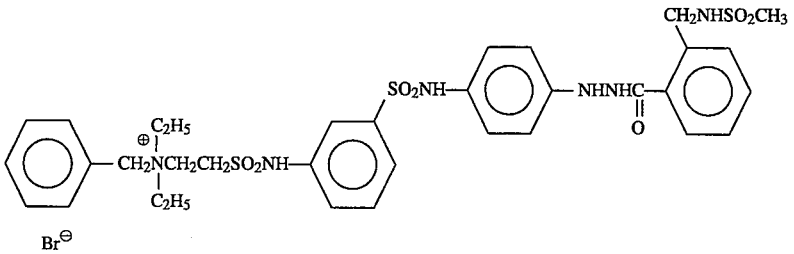
I-83
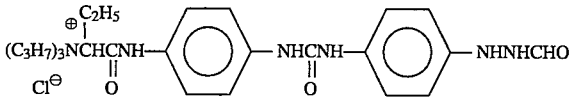
I-84
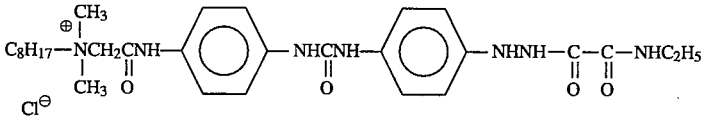
I-85
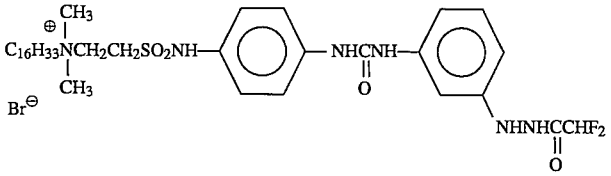
I-86
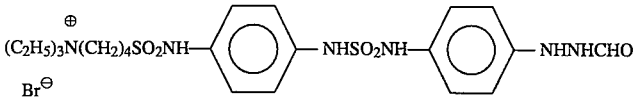
I-87
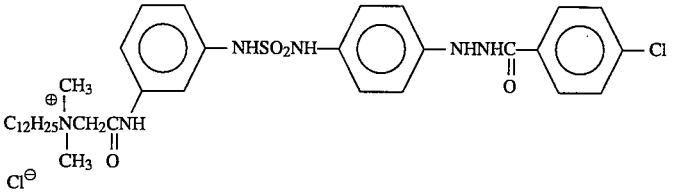

-continued
I-88
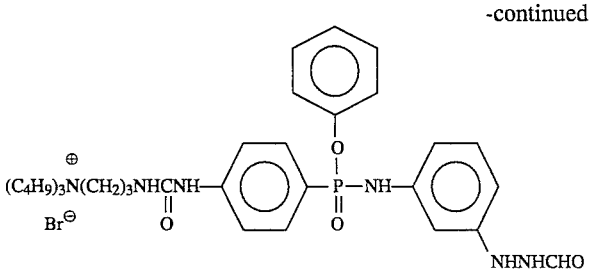
I-89
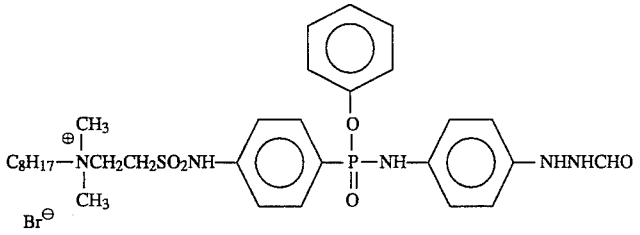
I-90
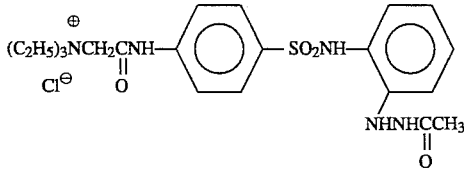
I-91
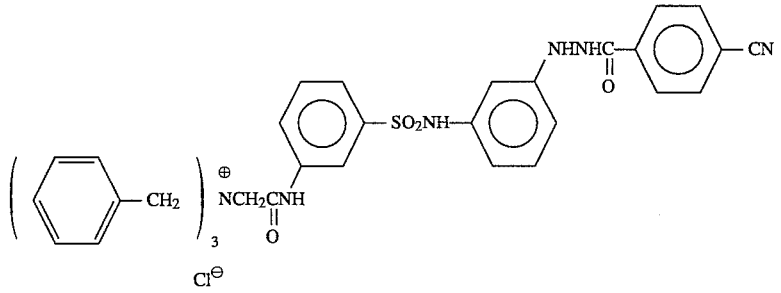
I-92
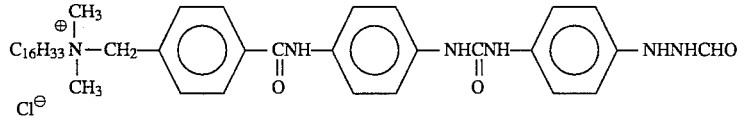
I-93
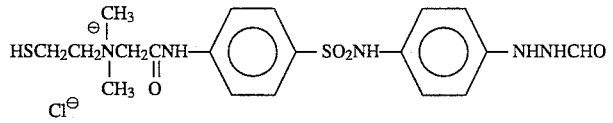
I-94
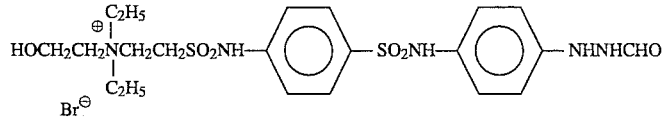
I-95
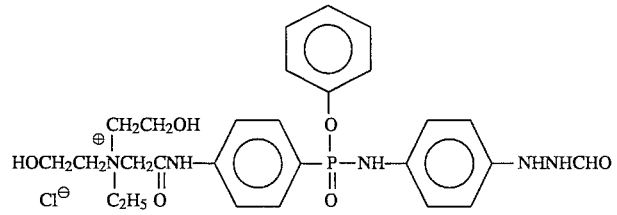

-continued

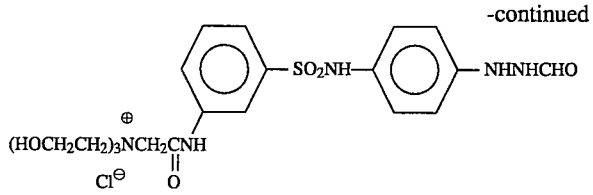

I-96

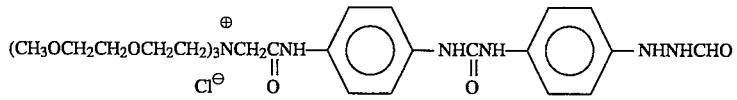

I-97

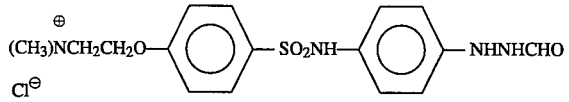

I-98

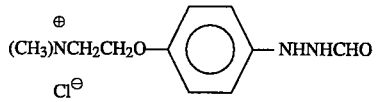

I-99

In addition to the compounds described above, the hydrazine derivative used in the present invention includes those described in Research Disclosure Item 23516 (November 1983, pp. 346) and the publications cited therein, and in addition, U.S. Pat. Nos. 4,080,207, 4,269,929, 4,276,364, 4,278,748, 4,385,108, 4,459,347, 4,560,638, and 4,478,928, British Patent 2,011,391B, JP-A-60-179,734, JP-A-62-270, 948, JP-A-63-29,751, JP-A-61-170,733, JP-A-61-270,744, JP-A-62-948, EP 217,310, or U.S. Pat. No. 4,686,167, JP-A-62-178,246, JP-A-63- 32,538, JP-A-63-104,047, JP-A-63-121,838, JP-A-63-129,337, JP-A- 63-223,744, JP-A-63-234,244, JP-A-63-234,245, JP-A-63- 234,246, JP-A-63-294,552, JP-A-63-306,438, JP-A-l-100,530, JP-A-1-105,941, JP-A-l-105,943, JP-A-64-10,233, JP-A-1-90, 439, JP-A- 1-276,128, JP-A-1-283,548, JP-A-1-280,747, JP-A-1-283,548, JP-A-1-285,940, JP-A-2-2541, JP-A-2-77057, JP-A-2-198,440, JP-A- 2-198,441, JP-A-198,442, JP-A-2-196,234, JP-A-2-196,235, JP-A- 2-220,042, JP-A-2-221,953, JP-A-2-221,954, JP-A-2-302,750, and JP-A-2-304,550 and Japanese patent application No. 63- 179,760.

An addition amount of the hydrazine derivative used in the present invention is preferably $1\times10^{-6}$ to $5\times10^{-2}$ mole per mole of silver halide, and in particularly, preferred within a range of $1\times10^{-5}$ to $2\times10^{-2}$ mole per mole of silver halide.

The hydrazine derivatives used in the present invention may be dissolved in a suitable solvent, for example, alcohols (methanol, ethanol, propanol, and fluorinated alcohol), ketones (acetone and methyl ethyl ketone), dimethylformamide, dimethylsulfoxide, and methyl cellosolve.

Further, the hydrazine derivatives may be dissolved with an aid of an oil such as dibutyl phthalate, tricresyl phosphate, glyceryl triacetate, and diethyl phthalate, and an auxiliary solvent such as ethyl acetate and cyclohexanone to mechanically disperse the emulsified solution thereof by the well known dispersing methods as well.

Alternatively, the powders of the hydrazine derivatives can be dispersed in water by a known solid dispersing method in a ball mill, a colloid mill or a supersonic wave as well.

A nucleation accelerator such as an amine derivative, an onium salt, a disulfide derivative, and a hydroxylamine derivative is preferably added to a silver halide emulsion layer and the other hydrophilic colloid layers in the silver halide photographic material of the present invention.

Examples of the nucleation accelerator, include an amine derivative, an onium salt, a disulfide derivative, and a hydroxylamine derivative.

As the amine derivative, the compounds described in JP-A- 60-140,340, JP-A-62-50,829, JP-A-62-222,241,JP-A-62-250,349, JP-A-62-280,733, JP-A-63-124,045, JP-A-63-133,145, and JP-A-63- 286,840 may be used, and more preferably the compounds having a group adsorbing property to silver halide, described in JP-A- 63-124,045, JP-A-63-133,145 and JP-A-63-286,840, the compounds having a total carbon atom of 20 or more, described in JP-A-62-222,241, and the amine compounds having an ethylene group, described in U.S. Pat. No. 4,975,354 and EP 458P706A, and the compounds described in JP-A-62-50829 may be used.

A pyridinium salt, an ammonium salt or a phosphonium salt is preferred as the onium salt. The compounds described in Japanese patent application No. 5-97866 can be used as an example of the preferred pyridinium salt. Further, the compounds described in JP-A-62-250,439 and JP-A-62-280, 733 can be used as an example of the preferred ammonium salt. The compounds described in JP-A-61-167,939 and JP-A-62-280,733 can be used as an example of the preferred phosphonium salt.

The compounds described in, for example, JP-A-61-198,147 can be used as the disulfide derivative.

Example of the hydroxymethyl derivative includes the compounds described in, for example, U.S. Pat. Nos. 4,698, 956 and 4,777,118, EP 231,850, and JP-A-62-50,829, more preferably a diaryl methacrynol derivative.

The compounds described in, for example, JP-A-3-168735 and JP-A-2-271351 can be used as the acetylene derivative.

The compounds described in, for example, JP-A-3-168736 can be used as the urea derivative.

The examples of the nucleation accelerator will be shown but the present invention will not be limited to the following compounds.

A-1)
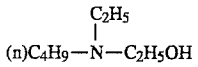
A-2)
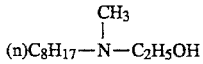
A-3)
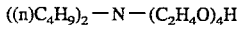
A-4)
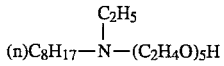
A-5)
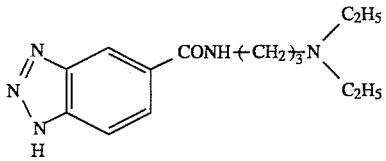
A-6)
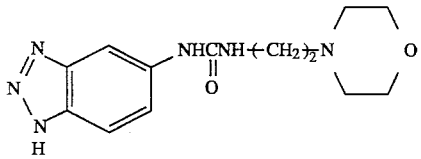
A-7)
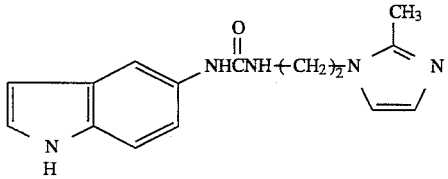
A-8)
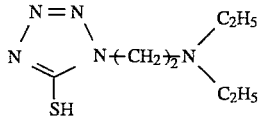
A-9)
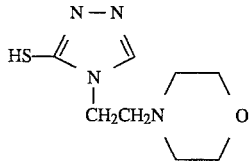
A-10)
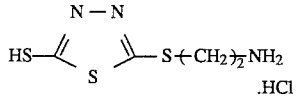
A-11)
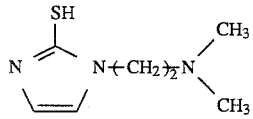
A-12)
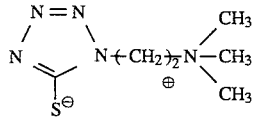
A-13)
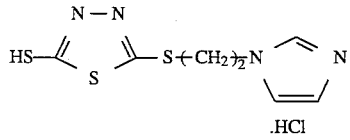

-continued
A-14)
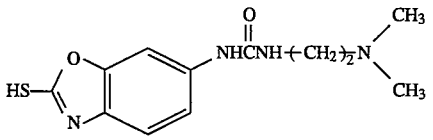
A-15)
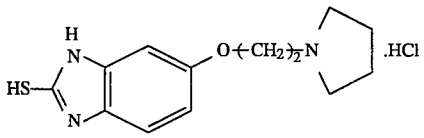
A-16)
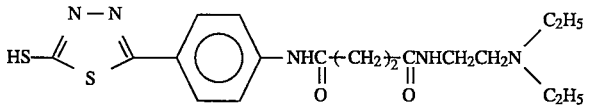
A-17)
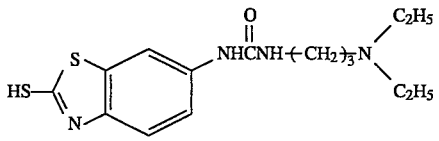
A-18)
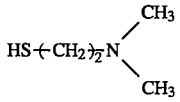
A-19)
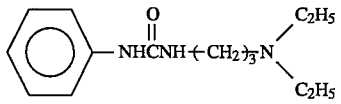
A-20)
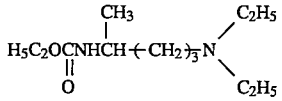
A-21)
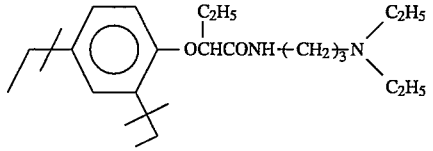
A-22)
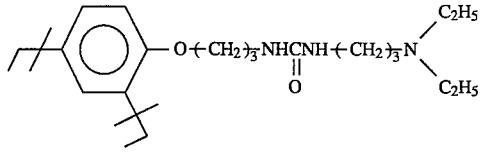
A-23)
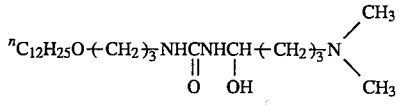
A-24)
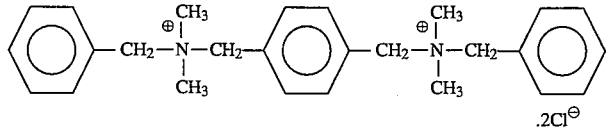
A-25)
$^{n}C_{16}H_{33}\overset{\oplus}{N}(CH_3)_3.Br^{\ominus}$
A-26)
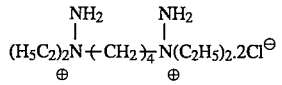

-continued
A-27)
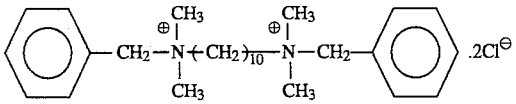
A-28
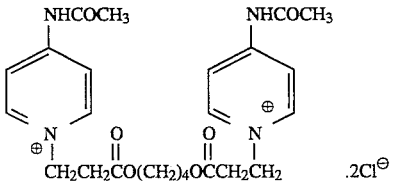
A-29
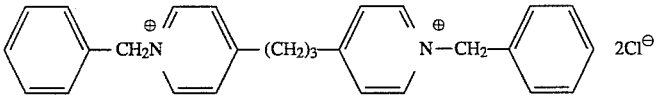
A-30
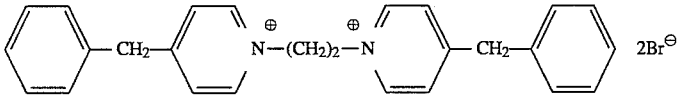
A-31
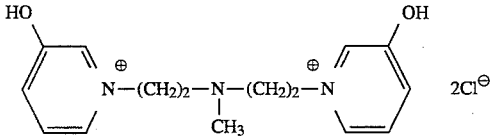
A-32
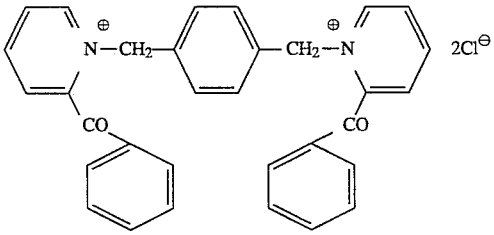
A-33
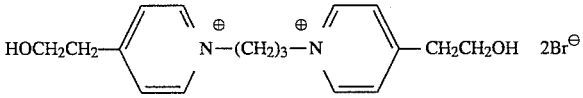
A-34
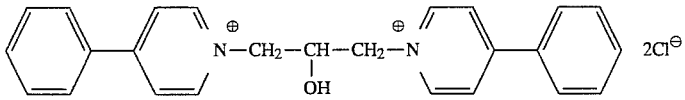
A-35
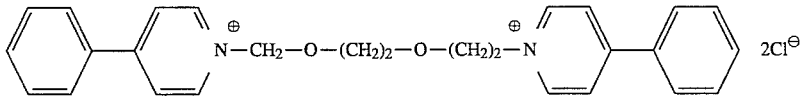
A-36
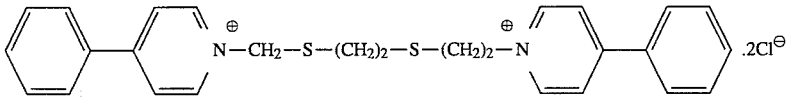
A-37
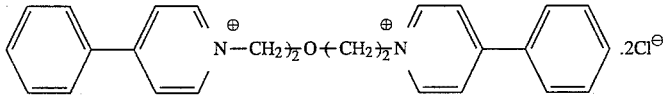
A-38
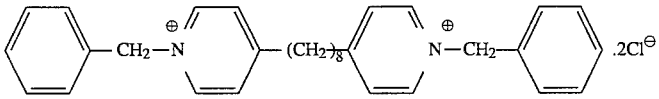
A-39
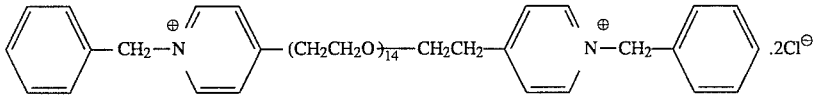

-continued
A-40
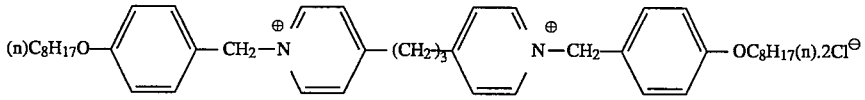
A-41
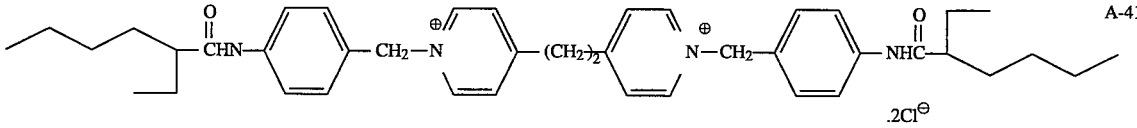
A-42
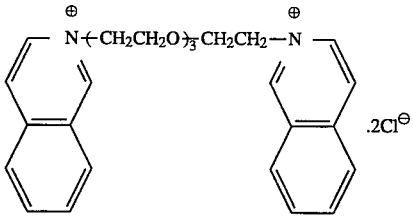
A-43
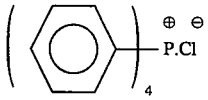
A-44
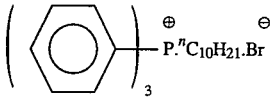
A-45
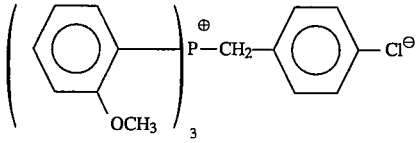
A-46
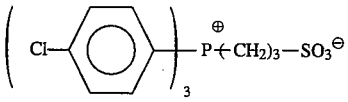
A-47
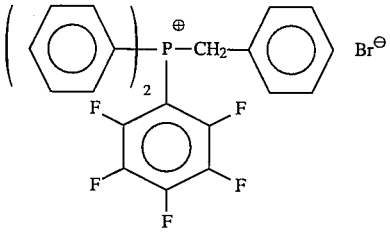
A-48
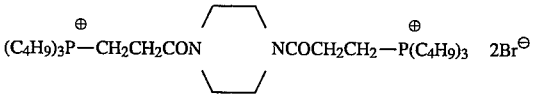
A-49
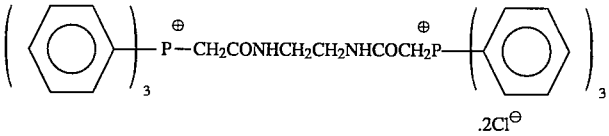

-continued
A-50
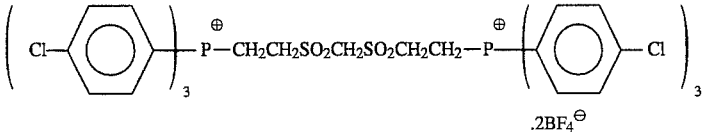
A-51
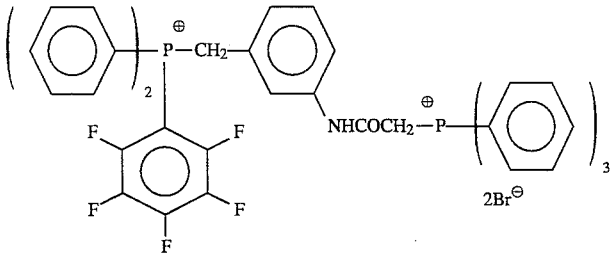
A-52
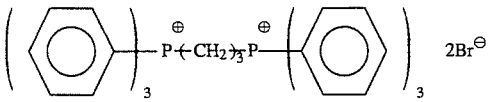
A-53
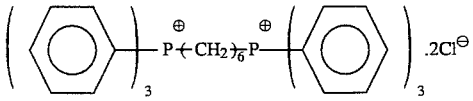
A-54
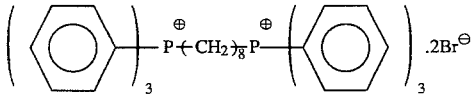
A-55
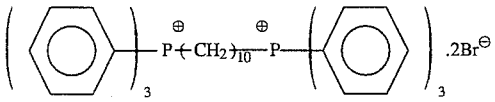
A-56
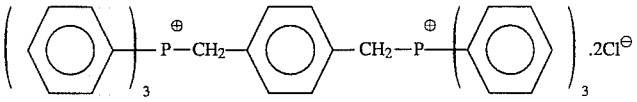
A-57
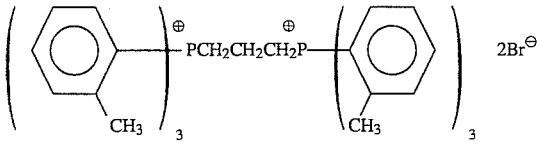
A-58
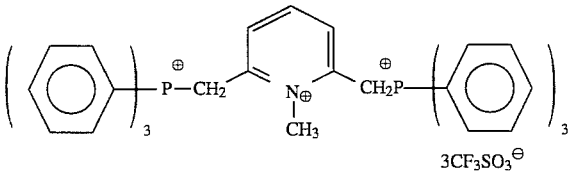
A-59
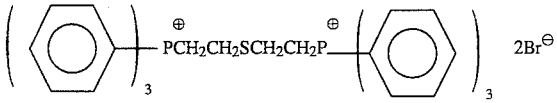

-continued
A-60
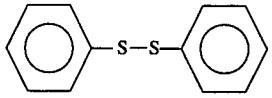
A-61
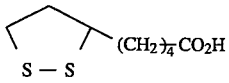
A-62
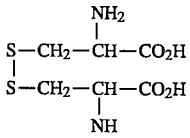
A-63
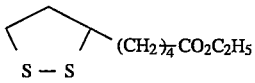
A-64
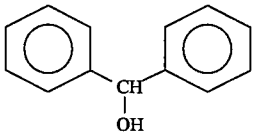
A-65
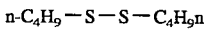
A-66
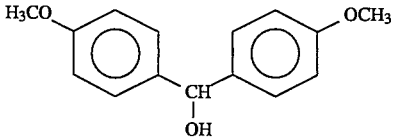
A-67
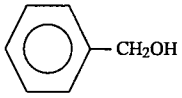
A-68
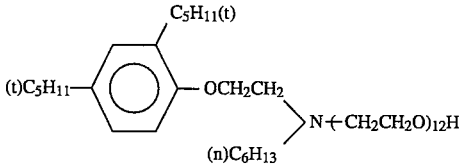
A-69
A-70
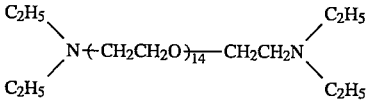
A-71
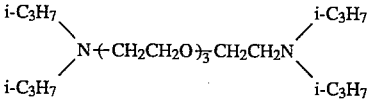
A-72
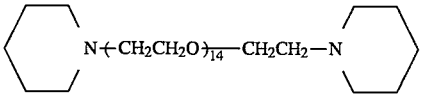
A-73
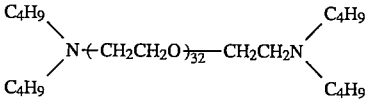
An optimum additional amount of these compounds may be varied depending on the kind thereof, and is used desirably in a range of $1.0\times10^{-2}$ to $1.0\times10^{-2}$ mole, preferably $1.0\times10^{-2}$ to $5.0\times10$ mole per mole of the hydrazine compound.

These compounds can be dissolved in a suitable solvent, for example, alcohols (methanol, ethanol, propanol, and fluorinated alcohol), ketones (acetone and methyl ethyl ketone), dimethylformamide, dimethylsulfoxide, and methyl cellosolve.

Further, the hydrazine derivatives can be dissolved with an aid of an oil such as dibutyl phthalate, tricresyl phosphate, glyceryl triacetate, and diethyl phthalate, and an auxiliary solvent such as ethyl acetate and cyclohexanone to mechanically disperse the emulsified solution thereof by the well known dispersing methods as well.

Alternatively, the powders of these compounds can be dispersed in water by a known solid dispersing method in a ball mill, a colloid mill or a supersonic wave as well.

No specific limitation is required for the halogen composition of the silver halide emulsion used in the present invention, suitable of which are selected from silver chloride, silver chlorobromide, silver chloroiodobromide, and silver iodobromide. The silver chloride content thereof is preferably 30 mole % or more.

Various processes well known in the arts of a silver halide photographic material can be used in a process for preparing the silver halide emulsion according to the present invention, which are described in, for example, "Chimie et Physique Photographique" written by P. Glafkides (published by Paul Montel Co., 1967), "Photographic Emulsion Chemistry" written by G. F. Duffin (published by The Focal Press Co., 1966), and "Making and Coating Photographic Emulsion" written by V. L. Zelikman et al (published by The Focal Press Co., 1964).

Any of one side mixing process, a simultaneous mixing process and the combination thereof may be used as a process for reacting a water soluble silver salt (an aqueous silver nitrate solution) with a water soluble halide. As one of the simultaneous mixing process, in which pAg in the solution for forming silver halide, is maintained constant, that is, the process called as a controlled double jet process may be used. A so-called silver halide solvent, such as ammonia, thioether, and tetra-substituted thiourea, is preferably used to form a grain.

A tetra-substituted thiourea compound is more preferable and is described in JP-A-53-82408 and JP-A-55-77737.

Preferred thiourea compound is tetramethyl thiourea or 1,3-dimethyl-2-imidazolidinethione.

A silver halide emulsion having a regular crystal form and a narrow grain size distribution can readily be prepared by the controlled double jet process and a grain forming process using a silver halide solvent, and said processes are the useful means for preparing the emulsion according to the present invention.

Silver halide contained in the photographic emulsion used in the present invention has an average grain size of 0.5 μm or less, particularly preferably 0.1 to 0.4 μm. The silver halide grains may have a relatively broad size distribution but have preferably a narrow size distribution. In particular, the sizes of the grains sharing 90% of the total in terms of a weight or a number reside within ±40% of an average grain size. In general, such an emulsion is defined as a monodispersed emulsion.

The silver halide grains contained in a photographic emulsion may have a regular crystal form such as cubic, octahedron, or a spherical silver halide grains or tabular silver halide grains having a high aspect ratio described in Research Disclosure No. 22534 (Jan. 1983). Further, they may be those having the composite form of these crystal habits.

The silver halide grains may be composed of either an uniform layer or distinctive layers in an inside and a surface thereof. Two or more kinds of the silver halide emulsions such as the inner latent image type and the surface latent image type silver halide emulsion grains, each described in JP-B-41-2068, separately prepared may be mixed and used.

A cadmium salt, sulfite a lead salt, a thallium salt, a rhodium salt or the complex salt thereof, and an iridium salt or the complex salt thereof may coexist with the silver halide emulsion in a process of a forming or a physical ripening the silver halide grains.

In the present invention, a silver halide emulsion particularly suitable for the light-sensitive materials for photographic line drawing and preparing a halftone dot is an emulsion prepared in the presence of the iridium salt or the complex salt thereof of $10^{-8}$ to $10^{-5}$ mole per mole of silver.

In the above case, the above amount of the iridium salt is preferably added before finishing a physical ripening in a manufacturing process of a silver halide emulsion, particularly in a grain formation.

The iridium salt used herein is a water soluble iridium salt or an iridium complex salt and includes, for example, iridium trichloride, iridium tetrachloride, potassium hexachloroiridate (III), potassium hexachloro-iridate (IV), and ammonium hexachloroiridate (III).

A so-called non-post ripening emulsion (a primitive emulsion) which is not subjected to a chemical sensitization can be used as a silver halide emulsion but may be subjected to the chemical sensitization. There can be used for the chemical sensitization, a process described in H. Frieser, "Die Grundlagen der Photographischen Prozesse mit Silver Halogeniden" Akademische Verlagsgesselschaft, (1968).

That is, there can be carried out singly or in combination, a sulfur sensitizing process using active gelatin and a compound containing sulfur capable of reacting with silver (for example, thiosulfate, thioureas, a mercapto compound, and rhodanines), a reduction sensitizing process using a reductive compound (for example, a stannous salt, amines, a hydrazine derivative, formamidinesulfinic acid, and a silane compound), and a noble metal sensitizing process using a noble metal compound (for example, in addition to a gold compound, a complex salt of the VIII group metal in the Periodic Table, such as platinum, iridium, and palladium). The preferred chemical sensitizing process is a gold sulfur sensitizing process.

The silver halide emulsion of the present invention contains preferably complex, of a transit ion metal such as Rh, Ru, Re, Os, Ir, and Cr.

As a ligand, nitrosyl and thionitrosyl crosslinking ligands, a halide ligand (fluoride, chloride, bromide and iodide), a cyanide ligand, a cyanate ligand, a thiocyanate ligand, a selenocyanate ligand, a tellurocyanate ligand, an acid ligand, and an aquo ligand may be used. In the case where the aquo ligand is present, it occupies preferably one or two of the ligands.

For example, a rhodium atom can be converted to an arbitrary form of a metal salt such as a single salt and a complex salt to add it in the preparation of the grains.

Example of the rhodium salt includes rhodium monochloride, rhodium dichloride, rhodium trichloride, and ammonium hexachlororhodate. Preferred is a water soluble trivalent. rhodium complex compound, for example, hydrogen hexachlororhodate (III) or the salt thereof (an ammonium salt, a sodium salt and a potassium salt).

These rhodium salts are used in an addition amount in a range of $1.0\times10^{-6}$ to $1.0\times10^{-3}$ mole, preferably $1.0\times10^{-5}$ to $1.0\times10^{-3}$ mole, and particularly preferably $5.0\times10^{-5}$ to $5.0\times10^{-4}$ mole per mole of silver halide.

The light-sensitive silver halide emulsion according to the present invention may be spectrally sensitized to a blue light having a relatively long wavelength, a green light, a red light, or an infrared ray by a sensitizing dye. Example of the sensitizing dye includes a cyanine dye, a merocynine dye, a complex cyanine dye, a complex meroyanine dye, a holopolar cyanine dye, a styryl dye, a hemicyanine dye, an oxonol dye, and a hemioxonol dye.

The useful sensitizing dyes according to the present invention are described in the literatures described or cited in, for example, Research Disclosures Item 17643, IV-A (December 1978, p-23) and Item 1831 X (August 1979, p-437).

These sensitizing dyes may be used either singly or in combination thereof. The combination of the sensitizing dyes is often used particularly for the purpose of a supersensitization. There may be incorporated into an emulsion together with the sensitizing byes, a dye having no spectral sensitizing action in itself or a material which absorbs substantially no visible ray and shows a supersensitization.

The combinations of the useful sensitizing dyes and the dyes showing the supersensitization and the materials showing the supersensitization are described in Research Disclosure vol. 176, No. 17643 (issued in December 1978), pp. 23, item J in IV.

A water soluble dye may be incorporated into a hydrophilic colloid layer in the photographic material according to the present invention as a filter dye or for various purposes of an anti-irradiation dye and others.

Such a dye includes an oxonol dye, a hemioxonol dye, a styryl dye, a merocyanine dye, a cyanine dye, and an azo dye. Of them, useful are the oxonol dye, the hemioxonol dye and the merocyanine dye. The examples of the dyes capable of being used are those described in German Patent 616,077, British Patents 584,609 and 1,117,429, JP-B-26-7777, JP-B-39-22069, JP-B-54-38129, JP-A-48-85130, JP-A-49-99620, JP-A-49-114420, JP-A-49-129537, PB Report No. 74175, and Photographic Abstract 128 ('21).

Gelatin is advantageously used as a binder or protective colloid which can be used in an emulsion layer and an intermediate layer in the light-sensitive material of the present invention, and the other hydrophilic colloids can be used as well.

For example, proteins such as an albumin, and casein; a gelatin derivative; a graft polymer of gelatin and the other polymers, a cellulose derivative such as hydroxyethyl cellulose, carboxymethyl cellulose and cellulose sulfuric acid esters; a sugar derivative such as sodium alginate and starch; and various synthetic hydrophilic high molecular materials such as homopolymers or copolymers including polyvinyl alcohol, partially acetalized polyvinyl alcohol, poly-N-vinyl-pyrrolidone, polyacrylic acid, polymethacrylic acid, polyacrylamide, polyvinylimidazole, and polyvinylpyrazole may be used.

In addition to lime-treated gelatin, acid-treated gelatin and enzyme-treated gelatin described in Bull. Soc. Sci. Photo. Japan No. 16, page 30 (1966) may be used, and a gelatin hydrolyzed product and a gelatin enzyme-decomposited product can be used as well.

Various compounds can be incorporated into the photographic emulsion used in the present invention for a purpose of preventing a fog in manufacturing, during storage or in a photographic processing of the light-sensitive material, or stabilizing a photographic performance. That is, there can be added many compounds known as an anti-fogging agent and a stabilizer, such as azoles, for example, a benzothiazolium salt , nitroimidazoles , nitrobenzimidazoles , chlorobenzimidazoles, bromobenzimidazoles, mercaptothiazoles, mercaptobenzothiazoles , mercaptobenzimidazoles , mercaptothiadiazoles, aminotriazoles, benzothiazoles, nitrobenzotriazoles, and mercaptetrazoles (particularly 1-phenyl-5-mercaptotetrazole ); mercaptopyrimidines; mercaptotriazines; a thioketo compound such as, for example, oxazolinethione; azaindenes, for example, triazaindenes, tetraazaindenes ( paricularly 4-hydroxy-substituted (1,3,3a, 7) tetreaazaindenes), and pentaazaindenes; and benzenesulfonic amide.

Of these additives, particularly preferred are benzotriazoles (for example, 5-methyl-benzotriazole). These compounds may be incorporated as well into a processing solution.

An inorganic or organic hardener may be incorporated into a photographic emulsion layer and the other hydrophilic colloid layers in the photographic material of the present invention. The hardness can be used singly or in combination, for example, a chromium salt (chromium alum and chromium acetate), aldehydes (formaldehyde, glyoxal and glutaraldehyde), an N-methylol compound (dimethylolurea and methyloldimethylhydantoin), a dioxane derivative (2,3-dihydroxydioxane), an active vinyl compound (1,3,5-triacryloyl-hexahydro-s-triazine), and mucohalogenic acids (mucochloric acid and mucophenoxychloric acid).

The photographic emulsion layers and other hydrophilic colloid layers of the light-sensitive material prepared according to the present invention may contain various surface active agents for various purposes such a as coating aid, anti-static, improvement in a sliding property, an emulsification-dispersion, anti-sticking, and improvement in the photographic characteristics (for example, development acceleration, harder contrast and sensitization).

A dispersion of a water insoluble or scarcely soluble synthetic polymer can be incorporated into the photographic material used in the present invention for a purpose of improvement in a dimensional stability. There can be used, for example, a polymer in which the monomer component therefor comprises a single component or combination of alkyl(metha)acrylate, alkoxyalkyl(metha)acrylate, glycidyl-(metha)acrylate, (metha)acrylamide, vinyl ester (for example, vinyl acetate), acrylonitrile, olefin, and styrene, or a combination of acrylic acid, methacrylic acid therewith, α,β-unsaturatred dicarboxylic acid, hydroxyalkyl-(metha)acrylate, sulfoalkyl(metha)acrylate, and styrene-sulfonic acid therewith.

Included in the support used for the light-sensitive material of the present invention are a paper laminated with an α-olefin polymer (for example, polyethylene, polypropylene, and an ethylene/butene copolymer), a flexible support of a synthetic paper, and metal. Of them, polyethylene terephthalate is particularly preferred. A subbing layer which can be used in the present invention, includes a subbing processing layer with an organic solvent system containing polyhydroxybenzenes, described in JP-A-49-3972, and an aqueous latex subbing processing layer described in JP-A-49-11118 and JP-A-52-10491. The above subbing layers can usually be provided on the surfaces thereof with chemical and physical treatments.

A surface activation treatment such as a chemicals treatment, a mechanical treatment, and a corona discharge treatment may be used as the above treatment.

The developing solution used in the present invention will be explained in detail below.

As described above, the developing solution of the present invention does not substantially contain a dihydroxybenzene developing agent, and a main developing agent is the compound represented by formula (II). As an auxiliary developing agents preferred in the developing solution of the present invention, are a 1-phenyl-3-pyrazolidone auxiliary developing agent and/or a p-aminophenol auxiliary developing agent.

The compound of formula (II) of the developing agent according to the present invention will be explained in detail. In formula (II), $R_{21}$ and $R_{22}$ each represents a hydroxy group, an amino group (including that containing an alkyl group having 1 to 10 carbon atoms as a substituent, for example, methyl, ethyl, n-butyl, and hydroxyethyl), an acylamino group (acetylamino and benzoylamino), an alkylsulfonylamino group (methanesulfonylamino), an arylsulfonylamino group (benzenesulfonylamino and p-toluenesulfonylamino), an alkoxycarbonylamino group (methoxycarbonylamino), a mercapto group, or an alkylthio group (methylthio and ethylthio). A hydroxy group, an amino group, an alkylsulfonylamino group, and an arylsulfonylamino group is as the preferred examples of $R_{21}$ and $R_{22}$.

In formula (II), X represents a carbon atom, an oxygen atom or a nitrogen atom and constitutes a 5- to 6-membered ring in cooperation with two vinyl carbons and a carbonyl carbonon which $R_1$ and $R_2$ are substituted. An example of X includes —O—, —C($R_{23}$)($R_{24}$)—, —C($R_{25}$)=, —C(=O)—, —N($R_{26}$)—, and -N= in combination. Provided that $R_{23}$, $R_{24}$, $R_{25}$ and $R_{26}$ each represents a hydrogen atom, an alkyl group having 1 to 10 carbon atoms and may be substituted (by a hydroxy group, a carboxy group and a sulfo group as a substituent), an aryl group having 6 to 15 carbon atoms and may be substituted (by an alkyl group, a halogen atom, a hydroxy group, a carboxy group, and a sulfo group as a substituent), a hydroxy group, or a carboxy group. Further, this 5- to 6-membered ring may form a saturated or unsaturated condensed ring.

The examples of this 5- to 6-membered ring include a dihydrofuranone ring, a dihydropyrone ring, a pyranone ring, a cyclopentenone ring, a cyclohexenone ring, a pyrrolinone ring, a pyrazolinone ring, a pyridone ring, an azacyclohexenone ring, and a uracil ring, more preferably a dihydrofuranone ring, a cyclopentenone ring, a cyclohexenone ring, a pyrazolinone ring, an azacyclohexenone ring, and a uracil ring.

Y represents =O or =N—$R_{23}$, wherein $R_{23}$ represents a hydrogen atom, a hydroxyl group, an alkyl group (for example, methyl and ethyl), an acyl group (for example, acetyl), a hydroxyalkyl group (for example, hydroxymethyl and hydroxyethyl), a sulfoalkyl group (for example, sulfomethyl and sulfoethyl), and a carboxyalkyl group (for example, carboxymethyl and carboxyethyl). The examples of the compounds of formula (II) will be shown below but the present invention will not be limited thereto.

II-1

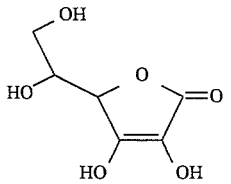

II-2

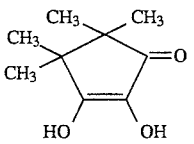

-continued

II-3

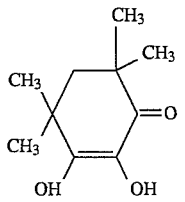

II-4

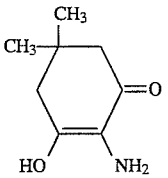

II-5

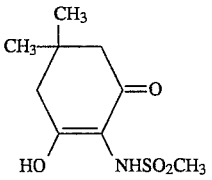

II-6

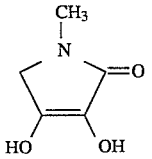

II-7

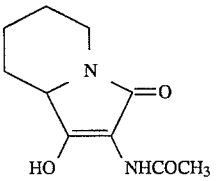

II-8

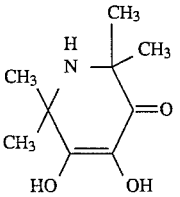

II-9

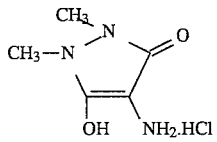

II-10

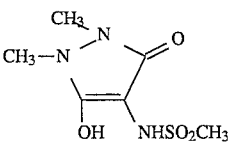

-continued
II-11
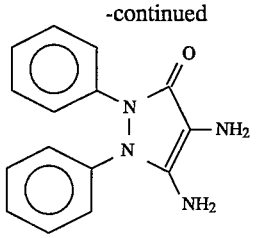
II-12
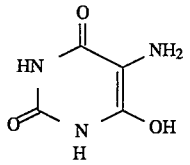
II-13
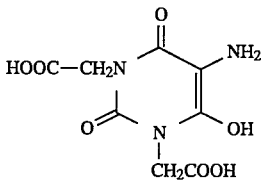
II-14
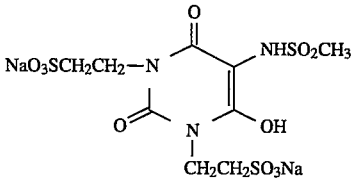
II-15
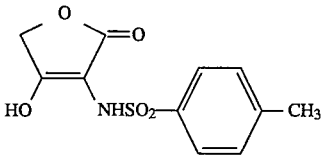
II-16
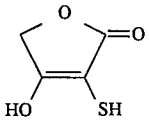
II-17
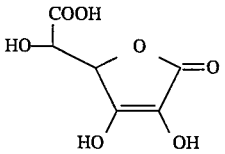
II-18
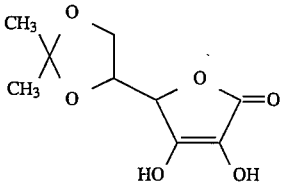
-continued
II-19
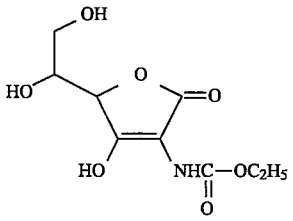
II-20
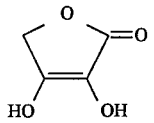
II-21
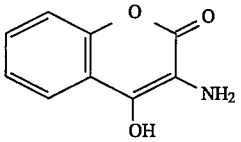
II-22
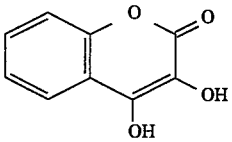
II-23
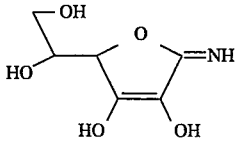
II-24
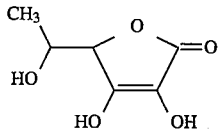
II-25
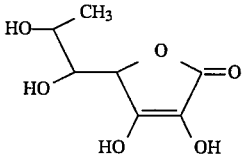
II-26
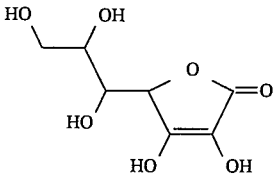
II-27
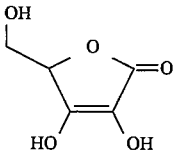
II-28
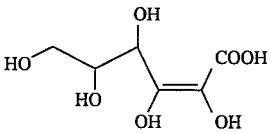

-continued

II-29

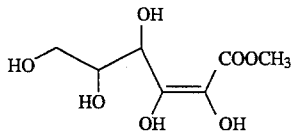

II-30

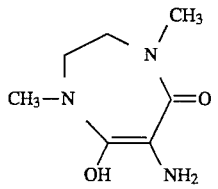

II-31

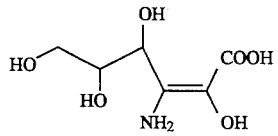

Of these compounds, ascorbic acid or erysorbic acid (optical steromer) is preferred.

An amount of the compound of formula (II) generally ranges in $5\times10^{-3}$ mole to 1 mole, particularly preferably $10^{-2}$ mole to 0.5 mole per liter of a developing solution.

The examples of 1-phenyl-3-pyrazolidone or the derivative thereof as an auxiliary developing agent, include 1-phenyl-3-pyrazolidone, 1-phenyl-4,4-dimethyl-3-pyrazolidone, 1-phenyl-4-methyl-4-hydroxymethyl-3-pyrazolidone, 1-phenyl-4,4-dihydroxymethyl-3-pyrazolidone, 1-phenyl-5-methyl-3-pyrazolidone, 1-p-aminophenyl-4,4-dimethyl-3-pyrazolidone, and 1-p-tolyl-4-methyl-4-hydroxymethyl-3-pyrazolidone. A p-aminophenol auxiliary developing agent includes N-methyl-p-aminophenol, p-aminophenol, N-(β-hydroxyethyl)-p-aminophenol, N-(4-hydroxyphenyl)glycine, 2-methy-p-aminophenol, and p-benzylaminophenol. Among them, N-methyl-p-amino-henol is preferred.

In the case where a combination of the compound of the present invention represented by formula (II) and 1-phenyl-3-pyrazolidones or p-aminophenols is used, the latter is usually used preferably in an amount of $10^{-3}$ mole/liter to 0.1 mole/liter, more preferably $10^{-3}$ mole/liter to 0.06 mole/liter of the developing solution. In the present invention, the term of "containing substantially no dihydroxybenzenes" means that a concentration of dihydroxybenzenes in a developing solution is insignificant (for example, $5\times10^{-4}$ mole/liter or less) as compared with the amounts of the compound of formula (II) and the auxiliary developing agents described above. The developing solution of the present invention preferably contains no dihydroxybenzenes.

There may be added to the developing solution of the present invention as a preservative, sulfites such as sodium sulfite, potassium sulfite, lithium sulfite, sodium bisulfite, potassium metabisulfite, and formaldehyde sodium bisulfite.

Sulfite is used in amount of 0.01 mole/liter or more of the developing solution. Use in lots amount of the sulfite will dissolve a silver halide emulsion grain resulting in causing silver stain. Further, this causes increase in COD (chemical oxygen demand) of the developing solution, and accordingly, an addition amount should be limited to a necessary minimum.

A developing solution used in the development processing in the present invention has preferably Ph ranging in 10.0 to 12.0, further preferably 10.4 to 12. If Ph is 12.0 or higher, suddenly increases stain and black spot in a non-image portion and therefore is not preferred. Further, Ph of 10.0 or less does not provide a sufficient contrast.

An alkali agent used for adjusting Ph includes sodium hydroxide, potassium hydroxide, sodium carbonate, and potassium carbonate.

There may be used in the developing solution of the present invention, sugars described in JP-A-60-93433 (for example, succharose), oximes (for example, acetoxime), phenols (for example, 5-sulfosalicylic acid), silicate, and a Ph buffer agent, such as sodiumtertiary phosphate and potassium tertiary phosphate. A concentration of the buffer agent is preferably 0.3 mole/liter or more of the developing solution. A boron compound such as boric acid and sodium metaborate is not preferred since it is liable to react with the compound of the present invention to inactivate thereof.

There may be contained a development inhibitor such as potassiumbromide and potassium iodide, an organic solvent such as ethylene glycol, diethylene glycol, triethylene glycol, dimethylformamide, methyl cellosolve, hexylene glycol, ethanol, and methanol, and an anti-fogging agent including an indazole compound such as 5-nitoindazole, a benzimidazole compound such as sodium 2-mercaptobenzimidazole-5-sulfonate, a benzotriazole compound such as 5-methylbenzotriazole, and there may be contained the development accelerators described in Research Disclosure Vol. 176, No. 17643, Item XXI (December 1978). There may be contained the amine compounds described in U.S. Pat. No. 4,269,929, JP-A-61-267759, and JP-A-2-208652. Further, a color improver, a surface active agent and a hardener may be contained on demand.

The amino compounds such as alkanolamine, described in European Patent Publication 136,582, British Patent 958, 678, U.S. Pat. No. 3,232,761, and JP-A-56-106244 can be used for the developing solution of the present invention for the purposes of development acceleration and contrast improvement.

The fixing solution used in the present invention is an aqueous thiosulfate solution having a pH of 3.8 or more, preferably 4,2 to 7.0.

A fixing agent includes sodium thiosulfate and ammonium thiosulfate, and ammonium thiosulfate is particularly preferred from a viewpoint of a fixing rate. An amount of the fixing agent can suitably be changed and is generally about 0.1 to about 6 mole/liter.

The fixing solution may contain water soluble aluminum salts which act as a hardener and include, for example, aluminum chloride, aluminum sulfate and potassium alum.

Tartaric acid, citric acid, gluconic acid or the derivatives thereof may be used for the fixing solution singly or in combination of two or more kinds. These compounds are effectively contained in the fixing solution in an amount of 0.005 mole/liter, particularly effectively 0.01 mole/liter to 0.03 mole/liter.

The fixing solution may contain a preservative (for example, sulfite and bisulfite), a Ph buffer agent (for example, acetic acid and boric acid), a Ph controller (for example, sulfuric acid and ammonia), a chelating agent having a softening ability, a surface active agent, a humidifier, a fixing accelerator, and the compounds described in JP-A-62-78551, if desired.

The fixing accelerator includes, for example, the thiourea derivatives described in JP-A-45-35754, JP-A-58-122535, and JP-A-58-122536, alcohol having a triple bond in a molecule, and the thioether compounds described in U.S. Pat. No. 4,126,459. Further, the compounds described in JP-A-2-44355 may be used. The compounds described in JP-A-64-4739 can be used as a dye-eluting accelerator.

In the development processing method in the present invention, processing is carried out with a washing water or stabilizing solution after the developing and fixing processings, followed by drying. The processing can be carried out as well in the washing water or stabilizing solution of a replenishing amount of 3 liter or less (including 0, that is, washing with stored water) per $m^2$ of a silver halide light-sensitive material. That is, not only a water-saving processing gets possible but also piping for installing an automatic developing machine can be unnecessary.

A multi-stage countercurrent system (for example, 2 stages and 3 stages) has so far been known as a method for reducing a replenishing amount of washing water. Application of this multi-stage countercurrent system allows a light-sensitive material after fixing to be proceeded to a cleaner direction, that is, contacting in succession the processing solutions which are not stained by a fixing solution, and therefore more efficient washing can be carried out.

In the case where washing is carried out in with small amount of water, there is preferably provided a washing bath with a squeeze roller and a crossover roller described in JP-A-63-18350 and JP-A-62-287252. Addition of various oxidizing agents and filtration with a filter may be combined for reduction of a public pollution load which is a problem in washing with a small amount of water.

In the water-saving processing and non-piping processing described above, an antimoled treatment is preferably provided to washing water or a stabilizing solution.

There can be used as the antimoled treatment, a UV irradiating method described in JP-A-60-263939, a method using a magnetic field described in JP-A-60-263940, a method using an ion exchange resin to make pure water, described in JP-A-61-131632, and a method using a disinfectant, described in JP-A-62-115154, JP-A-62-153952, JP-A-62-220951, and JP-A-62-209532. Further, there can be used as well in combination, the disinfectants, the fungicides and the surface active agents each described in L. F. West, "Water Quality Criteria" Photo. Sci. & Eng. Vol. 9, No. 6 (1965), M. W. Reach, "Microbiological Growths in Motion-Picture Processing", SMPTE Journal Vol. 85 (1976), R. O. Deegan, "Photo Processing Wash Water Biocides", J. Imaging Tech. Vol. 10, No. 6 (1984), JP-A-57-8542, JP-A-57-56143, JP-A-58-105145, JP-A-57-132146, JP-A-58-18631, JP-A-57-97530, and JP-A-57-157244.

Further, the isothiazolidine compounds described in J. Imaging Tech., 10 (6) page 242 written by R. T. Kreiman and the compounds described in Research Disclosure, Vol. 205, No. 20526 (1981, No. 4) can be used as well in combination as a microbiocide.

In addition thereto, there may be contained the compounds described in "Bokin Bobai no Kagaku" (Anti-fungus Anti-mold Chemistry) written by H. Horiguchi, Sankyo Shuppan (1982), and "Bokin Bobai Gakujutsu Handbook" (Anti-fungus Anti-mold Technical Handbook), Nippon Bokin Bobai Gakkai, Hakuhodo (1986).

When washing is carried out with a small amount of washing water in the method of the present invention, a constitution of a washing process described in JP-A-63-143548 is preferably taken.

Further, a part or all of an overflow solution from a washing or stabilizing bath, which is generated by replenishing water provided with an anti-mold treatment according to the method of the present invention to the washing or stabilizing bath depending on a processing, can be utilized as well for a processing solution having a fixing function the preceding bath thereof, as described in JP-A-60-235133.

In the development process in the present invention, the developing time thereof is 5 seconds to 3 minutes, preferably 8 seconds to 2 minutes. The developing temperature thereof is preferably 18° C. to 50° C., more preferably 24° C. to 40° C.

Temperature and time for fixing process are preferably about 18° C. to about 50° C. and 5 seconds to 3 minutes, more preferably 24° C. to 40° C. and 6 seconds to 2 minutes, respectively. Sufficient fixing can be carried out in these ranges, and a sensitizing dye can be eluted to an extent without forming a residual color.

A temperature and time for washing (or stabilizing) process are preferably 5° to 50° C. and 6 seconds to 3 minutes, more preferably 15° to 40° C. and 8 seconds to 2 minutes, respectively.

A light-sensitive material subjected to developing, fixing and washing (or stabilizing) process is dried by washing water with squeezing, that is, passing thereof through squeezing rollers. Drying is carried out at about 40° C. to 100° C., and drying time is suitably changed according to an environmental condition. It is usually about 4 seconds to 3 minutes, particularly preferably about 5 seconds to 1 minute at 40° C. to 80° C.

When a development process is carried out at 100 seconds or less throughout the process, in order to prevent a unevenness development resulted from a specific rapid process, specific arrangements are adapted such that application of rollers of a rubber material at an outlet of a developing tank, described in JP-A-63-151943, setting a discharge flow rate at 10 m/minute or more due to stirring a developing solution in a developing tank, described in JP-A-63-151944, and further, more strongly stirring at least during a development process than at stand-by described in JP-A-63-264758. Further, for a rapid process, particularly a constitution of the type in a fixing tank is preferably of oppositely disposed type in order to expedite a fixing speed. By providing with the oppositely disposed rollers the number of rollers may be decreased and a processing tank capacity may be reduced. That is, it becomes possible to make an automatic developing machine more compact.

Various additives and the development processing method used for the light-sensitive material of the present invention are not specifically limited, and those described in the following corresponding portions can be preferably applied.

| Item | Corresponding portion |
|---|---|
| 1) Nucleation accelerator | formula (II-m) to (II-p) and the compound examples II-1 to II-22 at pp. 9, right upper column, line 13 to pp. 16, left upper column, line 10 of JP-A-2-103536; and the compounds described in JP-A-1-179939. |
| 2) Silver halide emulsion and production process therefor | pp. 20, right lower column, line 12 to pp. 21, left lower column, line 14 of JP-A-2-97937; pp. 7, right upper column, line 19 to pp. 8, left lower column, line 12 of JP-A-2-12236; and the selenium sensitizing process |

-continued

| Item | Corresponding portion |
|---|---|
| | described in JP-A-5-11389. |
| 3) Spectral sensitizing dye | pp. 8, left lower column, line 13 to right lower column, line 4 of JP-A-2-12236; pp. 16, right lower column, line 3 to pp. 17, left lower column, line 20 of JP-A-2-103536; and further the spectral sensitizing dyes described in JP-A-1-112235, JP-A-2-124560, JP-A-3-7928, and JP-A-5-11389. |
| 4) Surface active agent | pp. 9, right upper column, line 7 to right lower column, line 7 of JP-A-2-12236; and pp. 2, left lower column, line 13 to pp. 4, right lower column, line 18 of JP-2-185424. |
| 5) Anti-fogging agent | pp. 17, right lower column, line 19 to pp. 18, right upper column, line 4, and right lower column, lines 1 to 5 of JP-A-2-103536; and further the thiosulfinic acid compounds described in JP-A-1-237538. |
| 6) Polymer latex | pp. 18, left lower column, lines 12 to 20 of JP-A-2-103536. |
| 7) Compound having an acid group | pp. 18, left lower column, line 6 to pp. 19, left upper column, line 1 of JP-A-2-103536. |
| 8) Matting agent, sliding agent and plasticizer | pp. 19, left upper column, line 15 to right upper column, line 15 of JP-A-2-103536. |
| 9) Hardener | pp. 18, right upper column, lines 5 to 17 of JP-A-2-103536. |
| 10) Dye | dyes described at pp. 17, right lower column, lines 1 to 18 of JP-A-2-103536; and solid dyes described in JP-A-2-294638 and JP-A-5-11382. |
| 11) Binder | pp. 3, right lower column, lines 1 to 20 of JP-A-2-18542. |

-continued

| Item | Corresponding portion |
|---|---|
| 12) Anti-black spot agent | the compounds described in U.S. Pat. No. 4,956,257, and JP-A-1-118832. |

-continued

| Item | Corresponding portion |
|---|---|
| 13) Redox compound | the compounds represented by formula (I) (particularly the compound examples 1 to 50) of JP-A-2-301743; formulas (R-1), (R-2) and (R-3) and the compound examples 1 to 75 described at pp. 3 to 20 of JP-A-3-174143; and further the compounds described in JP-A-4-278939 and Japanese Patent application No. 3-6946. |
| 14) Monomethine compound | the compounds of formula (II) (particularly the compound examples II-1 to II-26) described in JP-A-2-287532. |
| 15) Dihydroxybenzenes | pp. 11, left upper column to pp. 12 left lower column of JP-A-3-39948; and the compounds described in EP 452772A. |
| 16) Developing solution and developing process | pp. 19, right upper column, line 16 to pp. 21, left upper column, line 8 of JP-A-2-103536. |

The present invention will concretely be explained below with reference to the examples but the present invention will not be limited thereto.

Example 1

A developing solution containing the compound of the present invention represented by formula (II) was prepared in a manner as shown in Table-1. A developing solution containing hydroquinone as a principal component also was prepared as a comparative example.

TABLE 1

| Developing solution component | Developing solution number and component | | | | | | | | |
|---|---|---|---|---|---|---|---|---|---|
| | D-1 | D-2 | D-3 | D-4 | D-5 | D-6 | D-7 | D-8 | D-9 |
| NaOH | 10 gr | 10 gr | 15 gr | 15 gr | 15 gr | 15 gr | 15 gr | 15 gr | 15 gr |
| Diethylenetriaminepentaacetic acid | 1.5 | 1.5 | 1.5 | 1.5 | 1.5 | 1.5 | 1.5 | 1.5 | 1.5 |
| Potassium carbonate | 15 | 15 | 15 | 15 | 15 | 15 | 15 | 15 | 15 |
| Potassium bromide | 3 | 3 | 3 | 3 | 3 | 3 | 3 | 3 | 3 |
| 5-Methylbenzotriazole | 0.10 | 0.10 | 0.10 | 0.10 | 0.10 | 0.10 | 0.10 | 0.10 | 0.10 |
| 1-Phenyl-5-mercaptotetrazole | 0.02 | 0.02 | 0.02 | 0.02 | 0.02 | 0.02 | 0.02 | 0.02 | 0.02 |
| Potassium sulfite | 65 | 65 | 10 | 10 | 10 | 10 | 10 | 10 | 10 |
| 4-Hydroxymethyl-4-methyl-1-phenyl-3-pyrazolidone | 0.4 | 0.4 | 0.4 | 0.4 | 0.4 | 0.4 | | 0.4 | 0.4 |
| N-methyl-p-aminophenol | | | | | | | 1.2 | | |
| Hydroquinone | 25 | 25 | | | | | | | |
| Compound II-1 of the invention | | | 30 | 30 | 30 | 30 | 30 | | |
| Compound II-3 of the invention | | | | | | | | 28 | |
| Compound II-24 of the invention | | | | | | | | | 26 |
| Water was added to | 1 l | 1 l | 1 l | 1 l | 1 l | 1 l | 1 l | 1 l | 1 l |
| pH was adjusted to | 10.7 | 12.0 | 9.5 | 10.7 | 12.0 | 12.5 | 10.7 | 10.7 | 10.7 |
| COD value measured | 489 | 494 | 214 | 220 | 209 | 217 | 223 | 214 | 218 |
| Remark | Comp. | Comp. | Comp. | Inv. | Inv. | Inv. | Inv. | Inv. | Inv. |

Measurement of COD:

The developing solution shown in Table-1 was diluted by 100 times to measure COD (chemical oxygen demand) according to 18 of JIS K 0102. The results thereof are shown as well in Table-1. As can be found from Table-1, the developing solutions of the present invention show as very low COD as 1/10 or less as compared with the developing solutions using the conventional hydroquinone developing agents. This shows that not only this developing solution per se. has less risk from an ecological and toxicological point of view, but also in the case where this developing solution is used to carry out a development process with a conventional automatic developing machine, a load to an environment due to a developing solution component mixed in an overflow of a washing bath, that is, a contamination degree to an environment due to a washing waste is considered as being.

Example 2

A aqueous gelatin solution containing $1.5\times10^{-4}$ mole/liter of 1,3-dimethyl-2-imidazolidinethione and $7\times10^{-2}$ mole/liter of sodium chloride was maintained at 40° C. and was mixed. To the aqueous solution, added a mixed aqueous solution of sodium chloride and sodium bromide (containing potassium hexachloroiridate (III) of $2\times10^{-7}$ mole and ammonium hexachlororhodate (III) of $3\times10^{-7}$ mole each per mole of silver) and an aqueous silver nitrate solution by a double jet method over a period of 30 minutes, to thereby prepare a silver chlorobromide emulsion (silver bromide content: 30 mole %) having an average grain size of 0.25 μm and comprising monodispersed cube grains (fluctuation coefficient: 9.5%).

After a grain formation, the emulsion was washed according to a conventional manner to remove soluble salts. Then, gelatin was added and sodium chloride, sodium bromide and sodium hydroxide were further added to adjust Pag and Ph to 7.5 and 6.0, respectively, followed by adding sodium sulfate of $2\times10^{-5}$ mole and potassium chloraurate of $3\times10^{-5}$ mole each per mole of silver to this emulsion to provide a chemical sensitization at 60° C. for 40 minutes.

After chemical sensitization, the compound (a) of $1\times10^{-3}$ mole per mole of silver was added to prepare the emulsion A.

The following compound (b) of $5\times10^{-4}$ mole per mole of silver was added to the emulsion A as a sensitizing dye.

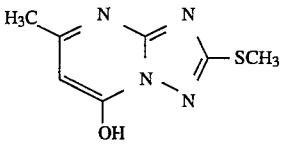

Compound (a)

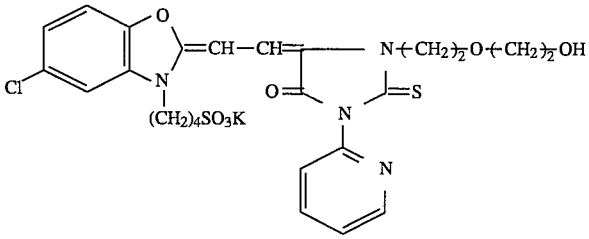

Compound (b)

This emulsion was designated as Emulsion A0, and the emulsions to which the hydrazine compounds I-71, I-72 and I-73 of formula (I) were added in an amount of $6\times10^{-4}$ mole per mole of silver were designated as Emulsions A1, A2 and A3, respectively.

Further, there were added to the respective emulsions, any one of the nucleation accelerators III-5, III-54 and III-73 of $4\times10^{-3}$ mole per mole of silver, the mercapto compound represented by (c) of $4\times10^{-4}$ mole per mole of silver, 5-methylbenzotriazole of $1\times10^{-3}$ mole per mole of silver, the polyethyl acrylate compound described in the manufacturing procedure 3 of U.S. Pat. No. 3,525,620 of 0.8 g per $m^2$ as a polymer latex, sodium p-dodecylbenzenesulfonate of 40 mg per $m^2$ as a coating aid, and 1,3-divinylsulfonyl-2-propane of 100 mg per $m^2$ as a hardener. The emulsions, thus prepared, were coated on a subbed polyethylene terephthalate support having a dye layer on a back face having an absorption in blue to green so as to silver amount may be 3.4 g per $m^2$.

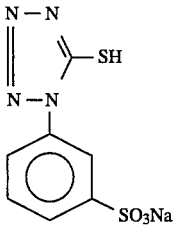

Compound (c)

A gelatin layer was coated as a protective layer on a silver halide emulsion layer. A gelatin amount in the protective layer was adjusted to 1.2 g per $m^2$. There were incorporated into the protective layer, amorphous $SiO_2$ of 40 mg/$m^2$ having an average particle size of 3.5 μm as a matting agent, silicon oil of 20 mg/$m^2$, sodium p-dodecylbenzenesulfonate of 60 mg/$m^2$ as a coating aid, and the fluorine surface active agent represented by (d) of 5 mg/$m^2$.

$$C_8F_{17}SO_2N(C_3H_{17})CH_2COOK$$

Compound (d)

The samples, thus prepared, from Emulsions A0, A1, A2 and A3 are shown altogether in Table-2.

TABLE 2

| Sample No. | Emulsion | Coated Sample: Nucleus-forming agent/Formula (I) | Coated Sample: Nucleus-forming accelerator |
|---|---|---|---|
| 1 | A0 | — | — |

TABLE 2-continued

| Sample No. | Emulsion | Coated Sample: Nucleus-forming agent/Formula (I) | Coated Sample: Nucleus-forming accelerator |
|---|---|---|---|
| 2 | A1 | I-67 | — |
| 3 | A1 | I-67 | A-5 |
| 4 | A1 | I-67 | A-54 |
| 5 | A1 | I-67 | A-70 |
| 6 | A2 | I-68 | — |
| 7 | A2 | I-68 | A-5 |
| 8 | A2 | I-68 | A-54 |
| 9 | A2 | I-68 | A-70 |
| 10 | A3 | I-69 | — |
| 11 | A3 | I-69 | A-5 |
| 12 | A3 | I-69 | A-54 |
| 13 | A3 | I-69 | A-70 |

Exposure and development process:

Exposure was given to the samples described above with tungsten light of 3200° K. for 5 seconds through an optical wedge for a sensitometry, and D-3, D-4, D-5 and D-6 among the developing solutions having the above compositions (Table-1) were used to carry out development at 35° C. for 30 seconds, followed by carrying out fixing, washing and drying processings. GR-F1 manufactured by Fuji Photo Film Co., Ltd. was used as a fixing solution.

The automatic developing machine FG-680A manufactured by Fuji Photo Film Co., Ltd. was used for this development process.

A sensitivity was shown by a relative value of a reciprocal of an exposure giving a density of 1.5. A (γ) value was applied as an indicator showing a contrast of an image, wherein the (γ) value was expressed by a gradient of a straight line obtained by connecting a point of fog + density 0.3 and a point of fog + density 3.0. That is, (γ)=(3.0–0.3)/(log (an exposure giving density 3.0) - log (an exposure giving density 0.3)). The (γ) value shows that the larger the (γ) value is, the harder the photographic characteristic. is.

A black spot was evaluated by five grades by observing an image portion with a loupe. Grade (5) shows the best level, at which the black spot is not generated; Grade (1) shows the worst level, at which the black spot is markedly generated; and Grade (3) is a limit level at which the generation of the black spot is practically allowable.

TABLE 3

| Exp. No. | Developing solution | Sample No. | Sensitivity | Gradation | Black speck | Remark |
|---|---|---|---|---|---|---|
| 1 | D-3 | 1 | 63 | 6.7 | 5 | Comp. |
| 2 | | 2 | 74 | 6.8 | 5 | Comp. |
| 3 | | 3 | 89 | 8.0 | 5 | Comp. |
| 4 | | 4 | 90 | 8.9 | 5 | Comp. |
| 5 | | 5 | 87 | 8.4 | 5 | Comp. |
| 6 | | 6 | 70 | 6.8 | 5 | Comp. |
| 7 | | 7 | 85 | 7.9 | 5 | Comp. |
| 8 | | 8 | 86 | 8.2 | 5 | Comp. |
| 9 | | 9 | 84 | 7.8 | 5 | Comp. |
| 10 | | 10 | 72 | 6.8 | 5 | Comp. |
| 11 | | 11 | 86 | 8.2 | 5 | Comp. |
| 12 | | 12 | 88 | 8.7 | 5 | Comp. |
| 13 | | 13 | 87 | 8.5 | 5 | Comp. |
| 14 | D-4 | 1 | 64 | 6.7 | 5 | Comp. |
| 15 | | 2 | 89 | 12.8 | 5 | Inv. |
| 16 | | 3 | 99 | 21.4 | 5 | Inv. |
| 17 | | 4 | 100 | 22.5 | 5 | Inv. |
| 18 | | 5 | 98 | 20.3 | 5 | Inv. |

TABLE 3-continued

| Exp. No. | Developing solution | Sample No. | Sensitivity | Gradation | Black speck | Remark |
|---|---|---|---|---|---|---|
| 19 | | 6 | 87 | 12.2 | 5 | Inv. |
| 20 | | 7 | 97 | 20.1 | 5 | Inv. |
| 21 | | 8 | 98 | 20.7 | 5 | Inv. |
| 22 | | 9 | 96 | 18.9 | 5 | Inv. |
| 23 | | 10 | 88 | 12.6 | 5 | Inv. |
| 24 | | 11 | 98 | 20.5 | 5 | Inv. |
| 25 | | 12 | 99 | 21.8 | 5 | Inv. |
| 26 | | 13 | 97 | 19.8 | 5 | Inv. |
| 27 | D-5 | 1 | 65 | 6.8 | 5 | Comp. |
| 28 | | 2 | 91 | 13.9 | 4 | Inv. |
| 29 | | 3 | 103 | 18.2 | 3 | Inv. |
| 30 | | 4 | 104 | 17.9 | 3 | Inv. |
| 31 | | 5 | 101 | 19.4 | 3 | Inv. |
| 32 | | 6 | 89 | 13.7 | 4 | Inv. |
| 33 | | 7 | 99 | 20.6 | 3 | Inv. |
| 34 | | 8 | 100 | 19.9 | 3 | Inv. |
| 35 | | 9 | 98 | 20.3 | 3 | Inv. |
| 36 | | 10 | 90 | 14.1 | 4 | Inv. |
| 37 | | 11 | 101 | 19.9 | 3 | Inv. |
| 38 | | 12 | 102 | 19.5 | 3 | Inv. |
| 39 | | 13 | 100 | 20.0 | 3 | Inv. |
| 40 | D-6 | 1 | 72 | 7.4 | 5 | Comp. |
| 41 | | 2 | 99 | 14.0 | 2 | Comp. |
| 42 | | 3 | 113 | 11.3 | 1 | Comp. |
| 43 | | 4 | 115 | 11.0 | 1 | Comp. |
| 44 | | 5 | 111 | 12.4 | 1 | Comp. |
| 45 | | 6 | 99 | 15.1 | 2 | Comp. |
| 46 | | 7 | 109 | 12.8 | 1 | Comp. |
| 47 | | 8 | 110 | 11.7 | 1 | Comp. |
| 48 | | 9 | 107 | 13.0 | 1 | Comp. |
| 49 | | 10 | 98 | 15.9 | 2 | Inv. |
| 50 | | 11 | 110 | 12.9 | 1 | Comp. |
| 51 | | 12 | 114 | 12.5 | 1 | Comp. |
| 52 | | 13 | 109 | 13.2 | 1 | Comp. |

As shown in Table-3, it can be found that according to the image-forming process using the compound of the present invention, the high sensitivity and contrast (γ) can be obtained with the developing solutions having Ph of 10 or higher and 12 or less. Particularly in the case where a nucleation accelerator was used in combination an image having a higher contrast was obtained at lower Ph. Controlling Ph to 12.5 increased a black spot beyond an allowable level and raised a fogging level as well. On the contrary, a contrast has been reduced.

Example 3

Preparation of a silver halide light-sensitive material:

Emulsion A4 was prepared in the same manner as in Example 1, except that the emulsion to which the following compound (e) of $5\times10^{-4}$ mole per mole of silver was added was used in place of the sensitizing dye (Compound b) contained in the samples of Example 1. The samples containing the hydrazine compounds I-69, I-71 and I-73 represented by formula (I) and the nucleation accelerators A-54 and A-73 in this emulsion as shown in Table-4 were prepared in the same manner as in Example 1.

Compound (e)

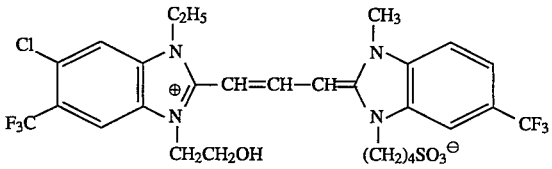

TABLE 4

| Sample No. | Coated Sample: Emulsion | Nucleation agent/Formula (I) | Nucleation accelerator |
|---|---|---|---|
| 1 | A4 | — | — |
| 2 | A4 | I-67 | A-54 |
| 3 | A4 | I-67 | A-70 |
| 4 | A4 | I-68 | A-54 |
| 5 | A4 | I-68 | A-70 |
| 6 | A4 | I-70 | A-54 |
| 7 | A4 | I-70 | A-70 |

Exposure and development process:

The above samples were subjected to the same exposure and development process as those in Example 1. With respect to the developing solutions used, D-3, D-4, D-6, D-7, D-8, and D-9 were selected from the developing solutions shown in Table-1.

Results:

The results obtained are shown in Table-5.

TABLE 5

| Exp. No. | Developing solution | Experimental Result: Sample No. | Sensitivity | Gradation | Black speck | Remark |
|---|---|---|---|---|---|---|
| 1 | D-3 | 1 | 63 | 6.6 | 5 | Comp. |
| 2 | | 2 | 64 | 8.0 | 5 | Comp. |
| 3 | | 3 | 63 | 7.9 | 5 | Comp. |
| 4 | | 4 | 65 | 8.3 | 5 | Comp. |
| 5 | | 5 | 64 | 8.1 | 5 | Comp. |
| 6 | | 6 | 63 | 7.8 | 5 | Comp. |
| 7 | | 7 | 64 | 8.0 | 5 | Comp. |
| 8 | D-4 | 1 | 63 | 6.7 | 5 | Comp. |
| 9 | | 2 | 100 | 21.8 | 5 | Inv. |
| 10 | | 3 | 97 | 20.0 | 5 | Inv. |
| 11 | | 4 | 103 | 23.2 | 4 | Inv. |
| 12 | | 5 | 99 | 21.5 | 5 | Inv. |
| 13 | | 6 | 98 | 20.4 | 5 | Inv. |
| 14 | | 7 | 97 | 19.9 | 5 | Inv. |
| 15 | D-6 | 1 | 66 | 6.2 | 5 | Comp. |
| 16 | | 2 | 113 | 11.4 | 1 | Comp. |
| 17 | | 3 | 116 | 12.3 | 2 | Comp. |
| 18 | | 4 | 117 | 11.1 | 1 | Comp. |
| 19 | | 5 | 111 | 11.8 | 1 | Comp. |
| 20 | | 6 | 108 | 12.2 | 1 | Comp. |
| 21 | | 7 | 105 | 12.7 | 2 | Comp. |
| 22 | D-7 | 1 | 62 | 6.7 | 5 | Comp. |
| 23 | | 2 | 101 | 22.3 | 5 | Inv. |
| 24 | | 3 | 96 | 20.5 | 5 | Inv. |
| 25 | | 4 | 104 | 23.7 | 4 | Inv. |
| 26 | | 5 | 100 | 21.9 | 5 | Inv. |
| 27 | | 6 | 99 | 20.6 | 5 | Inv. |
| 28 | | 7 | 98 | 20.4 | 5 | Inv. |
| 29 | D-8 | 1 | 63 | 6.7 | 5 | Comp. |
| 30 | | 2 | 99 | 21.2 | 5 | Inv. |
| 31 | | 3 | 95 | 19.4 | 5 | Inv. |

TABLE 5-continued

| Exp. No. | Developing solution | Experimental Result: Sample No. | Sensitivity | Gradation | Black speck | Remark |
|---|---|---|---|---|---|---|
| 32 | | 4 | 101 | 22.5 | 5 | Inv. |
| 33 | | 5 | 97 | 21.0 | 5 | Inv. |
| 34 | | 6 | 95 | 19.7 | 5 | Inv. |
| 35 | | 7 | 94 | 19.3 | 5 | Inv. |
| 36 | D-9 | 1 | 63 | 6.7 | 5 | Comp. |
| 37 | | 2 | 97 | 21.0 | 5 | Inv. |
| 38 | | 3 | 93 | 19.1 | 5 | Inv. |
| 39 | | 4 | 99 | 22.2 | 5 | Inv. |
| 40 | | 5 | 96 | 20.6 | 5 | Inv. |
| 41 | | 6 | 95 | 19.5 | 5 | Inv. |
| 42 | | 7 | 92 | 18.9 | 5 | Inv. |

As can be found from this table, use of the silver halide light-sensitive material containing the compound of the present invention and the image-forming process using the developing solution containing the compound of the present invention can provide an image free of a black speck and a fog and having a high contrast using a developing solution having a high safety.

While the invention has been described in detail and with reference to specific embodiments thereof, it will be apparent to one skilled in the art that various changes and modifications can be made therein without departing from the spirits and scope thereof.

What is claimed is:

1. An image-forming process for a silver halide photographic material having at least one silver halide emulsion layer on a support and containing a hydrazine compound in the emulsion layer or in another layer which comprise development processing in a developing solution after exposing, wherein the above hydrazine compound is represented by the following formula (I) and the developing solution contains a developing agent represented by the following formula (II) and substantially no dihydroxybenzene developing agent:

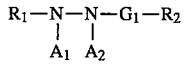

(I)

wherein $R_1$ represents an aliphatic group or an aromatic group; $R_2$ represents a hydrogen atom, an alkyl group, an aryl group, an unsaturated heterocyclic group, an alkoxy group, an aryloxy group, an amino group, a hydrazino group, a carbamoyl group, or an oxycarbonyl group; $G_1$ represents —CO—, —$SO_2$-, —SO—,

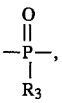

—CO—CO—, a thiocarbonyl group, or an iminomethylene group; both $A_1$ and $A_2$ represent a hydrogen atom, or one represents a hydrogen atom and the other represents an alkylsulfonyl group, an arylsulfonyl group, or an acyl group; $R_3$ is the same as those groups defined for $R_2$ or may be different from $R_2$; provided that at least one of $R_1$ and $R_2$ has a ballast group, at least one of $R_1$ and $R_2$ has a group enhancing adsorption to a silver halide grain surface, $R_1$ has a trialkylammonium group, or $R_1$ has an alkylthio group including a cycloalkylthio group or an arylthio group, except that $R_1$ is not

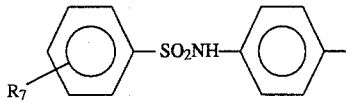

wherein $R_7$ represents a group containing three or more units of —$CH_2CH_2O$— in sequence or a group containing a pyridinum group; and n is 1 or 2;

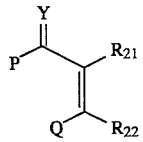

(II)

wherein $R_{21}$ and $R_{22}$ each represent a hydroxy group, an amino group, an acylamino group, an alkylsulfonylamino group, an arylsulfonylamino group, an alkoxycarbonylamino group, a mercapto group, or an alkylthio group; P and Q each represent a hydroxy group, a carboxyl group, an alkoxy group, a hydroxalkyl group, a carboxylalkyl group, a sulfo group, a sulfoalkyl group, an amino group, an aminoalkyl group, an alkyl group, or an aryl group, or P and Q represent an atomic group forming a 5- or 7-membered ring together with two vinyl carbon atoms on which $R_{21}$ and $R_{22}$ are substituted and a carbon atom on which Y is substituted; Y represents =O or =N—$R_{23}$; and $R_{23}$ represents a hydrogen atom, a hydroxyl group, an alkyl group, an acyl group, a hydroxyalkyl group, a sulfoalkyl group, or a carboxyalkyl group.

2. The image-forming process as claimed in claim 1, wherein the silver halide emulsion layer or hydrophilic colloid layers contain at least one of an amine derivative, an onium salt, a disulfide derivative, and a hydroxymethyl derivative as a nucleation accelerator.

3. The image-forming process as claimed in claim 1, wherein the pH of the developing solution is from 10.0 to 12.0.

4. The image-forming process as claimed in claim 1, wherein a 1-phenyl-3-pyrazolidone compound and/or a p-aminophenol compound are further present as an auxiliary developing agent.

5. The image-forming process as in claim 1, wherein the hydrazine compound represented by formula (I) is represented by formula (X);

$$(R_{11})_3N^+\text{-}R_{12}\text{-}L_{11}\text{-}(R_{13}\text{-}L_{11})_m\text{-}R_{14}\text{-}NHNH\text{-}G_{11}\text{-}R_{15}\ X^- \qquad (X)$$

wherein $L_{11}$ represents a single bond, —O—, —S—, —$NR_{16}$—, —CO, —$SO_{12}$—, —P(O)($G_{12}R_{16}$)—, or the combination thereof; $L_{12}$ represents —$SO_2NR_{16}$—, —$NR_{16}SO_2NR_{16}$—, —$CONR_{16}$—, —$NR_{16}CONR_{16}$—, or -$G_{12}$P(O)($G_{12}R_{16}$)$NR_{16}$—, in which $G_{12}$ represents a single bond, —O—, or —$NR_{16}$—, wherein $R_{16}$ represents a hydrogen atom, an aliphatic group, or an aromatic group; $G_{11}$ is the same as G in formula (I), and $R_{15}$ is the same as $R_2$ in formula (I); $R_{11}$ represents an aliphatic group or an aromatic group (three $R_{11}$'s may be the same or different), and $R_{12}$, $R_{13}$ and $R_{14}$ each represents a divalent aliphatic group or aromatic group; m is 0 or 1, and $X^-$ represents a paired anion portion in the case where $X^-$ forms a paired anion or an intermolecular salt.

6. The image-forming process as in claim 1, wherein the hydrazine compound represented by formula (I) is present in an amount of $1\times10^{-6}$ to $5\times10^{-2}$ mole per mole of Ag.

7. The image-forming process as in claim 1, wherein the nuclaration accelerator is present in an amount of $1.0\times10^{-2}$ to $1.0\times10^{2}$ mole per mole of the hydrazing compound.

8. The image-forming process as in claim 1, wherein the developing agent represented by formula (II) is ascorbic acid or erysorbic acid.

9. The image-forming process as in claim 1, wherein a developing time is from 5 second to 3 minutes.

10. The image-forming process as in claim 1, wherein one of $A_1$ and $A_2$ in formula (I) represents a hydrogen atom and the other represents an alkylsulfonyl group substituted with a halogen atom, an ether group, a sulfonamide group, a carbonamide group, a hydroxyl group, a carboxy group or a sulfonic acid group; an arylsulfonyl group substituted with a halogen atom, an ether group, a sulfonamide group, a carbonamide group, a hydroxyl group, a carboxy group or a sulfonic acid group; or an acyl group substituted with a halogen atom, an ether group, a sulfonamide group, a carbonamide group, a hydroxyl group, a carboxy group or a sulfonic acid group.

* * * * *